United States Patent
Lee et al.

(10) Patent No.: US 10,788,874 B2
(45) Date of Patent: Sep. 29, 2020

(54) METHOD AND ELECTRONIC DEVICE FOR CONTROLLING POWER BETWEEN ELECTRONIC DEVICES

(71) Applicant: Samsung Electronics Co., Ltd., Gyeonggi-do (KR)

(72) Inventors: Tae-Kyung Lee, Seoul (KR); Woo-Taek Song, Gyeonggi-do (KR); Hyun-Ji Song, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 214 days.

(21) Appl. No.: 15/987,222

(22) Filed: May 23, 2018

(65) Prior Publication Data

US 2019/0064900 A1 Feb. 28, 2019

(30) Foreign Application Priority Data

Aug. 23, 2017 (KR) .......................... 10-2017-0106946

(51) Int. Cl.
*G06F 1/26* (2006.01)

(52) U.S. Cl.
CPC .............. *G06F 1/266* (2013.01); *G06F 1/263* (2013.01)

(58) Field of Classification Search
CPC .................................. G06F 1/266; G06F 1/263
See application file for complete search history.

(56) References Cited

U.S. PATENT DOCUMENTS

| 6,526,516 B1* | 2/2003 | Ishikawa ................. G06F 1/189 348/207.2 |
| 8,686,688 B2* | 4/2014 | Han .......................... H02J 7/00 320/111 |
| 8,756,358 B2* | 6/2014 | Su .......................... H02J 7/0036 710/313 |

(Continued)

FOREIGN PATENT DOCUMENTS

KR 10-2016-0147636 A 12/2016

OTHER PUBLICATIONS

"Why does my iPhone turn on when I plug it in to charge?"; Jan. 30, 2012; http://webcache.googleusercontent.com/search?q=cache:cxi8olGg1IEJ:http://apple.stackexchange.com.questions/38715/why-does-my-iphone-turn-on-when-i-plug-it-in-to-charge&hl=en&gl=nl&strip=1&vwsrc=0.

(Continued)

*Primary Examiner* — Stefan Stoynov
(74) *Attorney, Agent, or Firm* — Cha & Reiter, LLC

(57) ABSTRACT

An electronic device according to various embodiments may include a first connector including at least one first pin and at least one second pin configured to be connected to an external electronic device; a second connector comprising at least one third pin and at least one fourth pin configured to be connected to a power supply; a switching circuit; and a processor electrically connected to the first connector, the second connector, and the switching circuit, wherein the processor is configured to determine a connection with the external electronic device or a connection with the power supply, and the processor is set to cause, when connected to the external electronic device via the first connector and connected to the power supply via the second connector, (Continued)

power received from the power supply via the at least one third pin to be supplied to the at least one first pin using the switching circuit.

18 Claims, 21 Drawing Sheets

(56) References Cited

U.S. PATENT DOCUMENTS

| | | | |
|---|---|---|---|
| 2014/0219154 A1* | 8/2014 | Liu | H04W 52/0274 |
| | | | 370/311 |
| 2017/0097666 A1 | 4/2017 | Shin et al. | |
| 2017/0212574 A1 | 7/2017 | Kang et al. | |
| 2018/0329473 A1* | 11/2018 | Horie | G06F 1/266 |

OTHER PUBLICATIONS

European Search Report dated Jan. 7, 2019.
"On-The-Go and Embedded Host Supplement to the USB Revision 2.0 Specification"; XP 055651275; May 8, 2009.
European Search Report dated Apr. 7, 2020.

* cited by examiner

| | PIN No. | Signal Name | NOTE |
|---|---|---|---|
| 1711a,1711b | 1 | GND | GROUND |
| 1712a,1712b | 2 | TX+ | Super speed TX positive |
| 1713a,1713b | 3 | TX- | Super speed TX negative |
| 1714a,1714b | 4 | V$_{BUS}$ | USB cable CHARGING POWER |
| 1715a,1715b | 5 | CC | IDENTIFICATION TERMINAL |
| 1716a,1716b | 6 | D+ | + line of the differential bi-directional USB signal |
| 1717a,1717b | 7 | D- | - line of the differential bi-directional USB signal |
| 1718a,1718b | 8 | SBU | Side Band Use : additional purpose pin (ex: Audio signal, display signal, etc) |
| 1719a,1719b | 9 | V$_{BUS}$ | USB cable IDENTIFICATION TERMINAL |
| 1720a,1720b | 10 | RX- | Super speed RX negative |
| 1721a,1721b | 11 | RX+ | Super speed RX positive |
| 1722a,1722b | 12 | GND | GROUND |

FIG.18

METHOD AND ELECTRONIC DEVICE FOR CONTROLLING POWER BETWEEN ELECTRONIC DEVICES

CROSS-REFERENCE TO RELATED APPLICATION

This application is based on and claims priority under 35 U.S.C. § 119 to Korean Patent Application No. 10-2017-0106946, filed on Aug. 23, 2017, in the Korean Intellectual Property Office, the disclosure of which is incorporated by reference herein in its entirety.

BACKGROUND

1. Field

This disclosure relates to a method and electronic device for controlling power between electronic devices for controlling power of an external electronic device connected to the electronic device.

2. Description of Related Art

Electronic devices such as smart phones, tablet PCs, or notebook PCs can be used in various fields due for convenience and portability. In recent years, there is an increasing interest in an external device, for example, an accessory device, which is functionally connectable with the electronic devices described above. In addition, the accessory device may also be connected to an auxiliary accessory device, for example, a power supply.

An external electronic device, may be used by being functionally connected to a mobile terminal (e.g., a smart phone) or the like. At this time, the external electronic device may be powered from the mobile terminal. In addition, the external electronic device may also be connected to an auxiliary accessory device, for example, a power supply.

The above information is presented as background information only to assist with an understanding of the present disclosure. No determination has been made, and no assertion is made, as to whether any of the above might be applicable as prior art with regards to the present disclosure.

SUMMARY

Even if the power supply is connected to an HMD device, a problem may occur that power is not supplied to the HMD device or an external electronic device (e.g., a smart phone) connected to the HMD device when the HMD device is OFF. In order for the HMD device to be turned ON, it may be necessary for (1) the HMD device to receive power from the external electronic device connected to the HMD device; and (2) the HMD device to be booted. However, when the external electronic device is OFF, even if both the power supply and the external electronic device are connected to the HMD device, the HMD device might not be booted. Thus, it might not be possible to supply power to the HMD device or the external electronic device or to control the power of the external electronic device.

Various embodiments disclosed herein provide a method and electronic device for controlling power between electronic devices, in which even when an external electronic device (e.g., a smart phone) in an OFF state is connected to an electronic device (e.g., an HMD device), the electronic device may be turned ON by a power supply connected to the electronic device, and the power of the external electronic device may be controlled by the electronic device in the ON state.

In order to solve the problems described above or other problems, an electronic device according to various embodiments may include a first connector including at least one first pin and at least one second pin configured to be connected to an external electronic device; a second connector comprising at least one third pin and at least one fourth pin configured to be connected to a power supply; a switching circuit; and a processor electrically connected to the first connector, the second connector, and the switching circuit, wherein the processor is configured to determine a connection with the external electronic device or a connection with the power supply are connected, and the processor is set to cause, when connected to the external electronic device via the first connector and connected to the power supply via the second connector, power received from the power supply via the at least one third pin to be supplied to the at least one first pin using the switching circuit.

According to other embodiments, an electronic device can comprise: a first connector including at least one first pin and at least one second pin configured to be connected to an external electronic device; a second connector comprising at least one third pin and at least one fourth pin configured to be connected to a power supply; a switching circuit set to supply, when connected to the external electronic device via the first connector and connected to the power supply via the second connector, power received from the power supply via the at least one third pin to the at least one first pin; and a processor set to transmit, when it is confirmed that the power of the external electronic device is in an OFF state using the first connector, information related to control of power of the external electronic device via the at least one second pin of the first connector.

According to another embodiment, a method of controlling power between electronic devices, comprises: determining a connection with an external electronic device via at a first connector comprising at least one first pin and at least one second pin; determining a connection with a power supply via a second connector comprising at least one third pin and at least one fourth pin; receiving power from the power supply via the at least one third pin; and supplying the power, which is received from the power supply via the at least one third pin, to the at least one first pin when it is determined that an electronic device is connected to the external electronic device via the first connector and is connected to the power supply via the second connector.

With a method and an electronic device for controlling power between electronic devices according to various embodiments, even when an external electronic device (e.g., a smart phone) connected to an electronic device (e.g., an HMD device) is in an OFF state, the electronic device can be in the ON state by a power supply connected to the electronic device so that power can be supplied to the external electronic device.

With a method and an electronic device for controlling power between electronic devices according to various embodiments, even when an external electronic device (e.g., a smart phone) connected to an electronic device (e.g., an HMD device) is in an OFF state, the electronic device can be in the ON state by a power supply connected to the electronic device so that power of the external electronic device can be controlled.

BRIEF DESCRIPTION OF THE DRAWINGS

The above and other aspects, features, and advantages of the present disclosure will be more apparent from the following detailed description taken in conjunction with the accompanying drawings, in which:

FIG. 18 is a view illustrating a detailed structure of respective pins that constitute the connector according to various embodiments;

DETAILED DESCRIPTION

Figure 1:
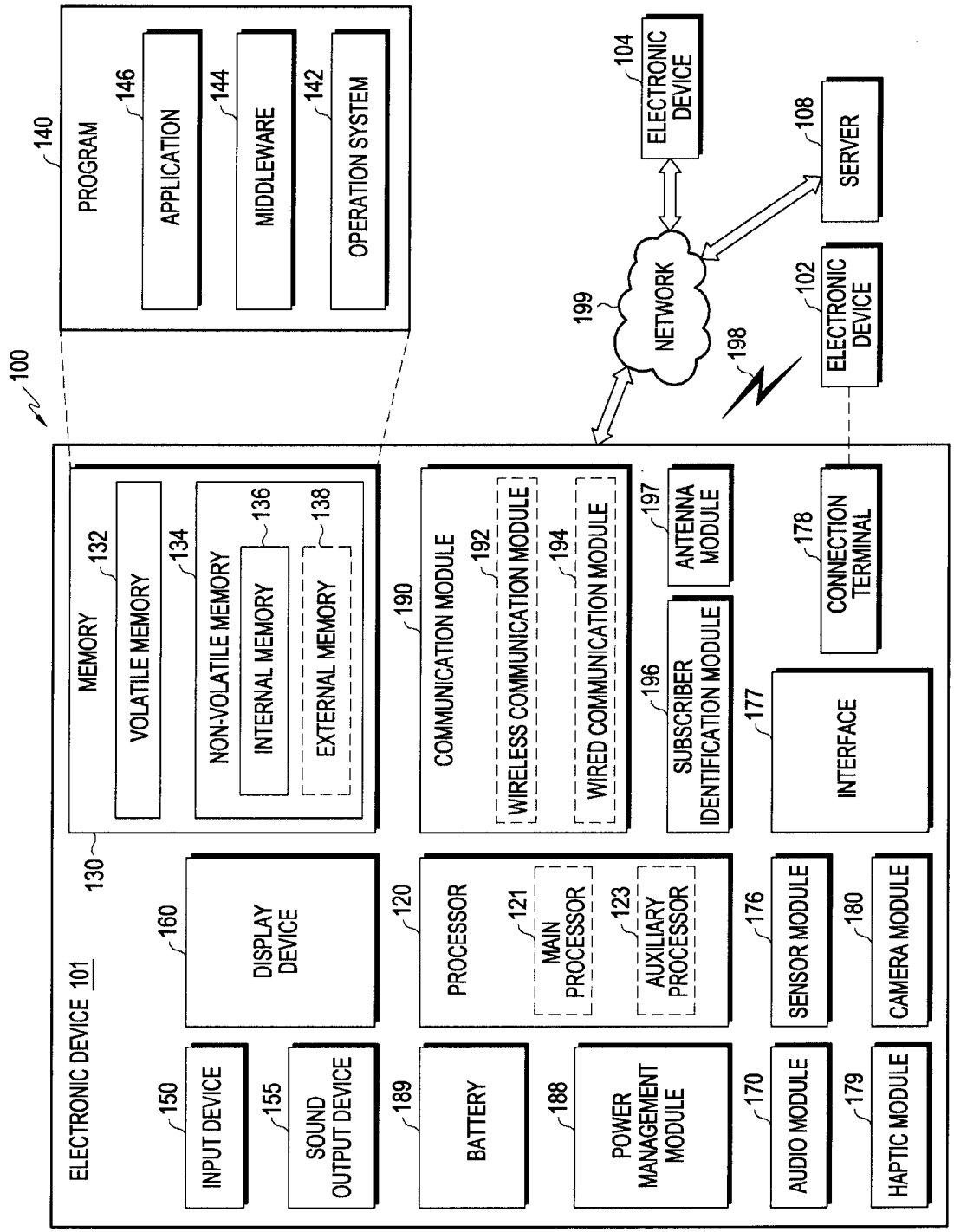
FIG. 1 is a view illustrating a network environment in which power is controlled between electronic devices according to various embodiments.

Hereinafter, various embodiments will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. The expression "a first", "a second", "the first", or "the second" used in various embodiments may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element). The expression "a plurality of" may indicate "at least two".

The expression "configured to" as used in various embodiments may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. The Head-Mounted Device (HMD) may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a toaster, a streetlamp, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment is not limited to the above described devices. In the present disclosure, the term "user" may indicate a person using an electronic device or a device (e.g., an artificial intelligence electronic device) using an electronic device.

FIG. 1 is a block diagram of an electronic device 101 in a network environment 100, in which power is controlled between electronic devices, according to various embodiments. Referring to FIG. 1, the electronic device 101 in the network environment 100 may communicate with an electronic device 102 via a first network 198 (e.g., short-range wireless communication), or may communicate with an electronic device 104 or a server 108 via a second network 199 (e.g., long-range wireless communication). According to one embodiment, the electronic device 101 may communicate with the electronic device 104 via the server 108. According to one embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, at least one of the above-mentioned components may be omitted from the electronic device 101 or other components may be added to the electronic device 101. In some embodiments, some components may be implemented in an integrated form like, for example, the sensor module 176 (e.g., a fingerprint sensor, an iris sensor, or an illuminance sensor), which is embedded in, for example, the display device 160 (e.g., a display).

In certain embodiments, the power management module 188 can include a power management circuit. The power management module 188 can drive the electronic device 100 by applying received power to the processor 120 as will be describe below.

The processor 120 may control one or more other components (e.g., a hardware or software component) of the electronic device 101, which are connected to the processor 120, and may perform various data processing and arithmetic operations by driving, for example, software (e.g., a program 140). The processor 120 may load commands or data, which are received from other components (e.g., the sensor module 176 or the communication module 190), into a volatile memory 132 so as to process the commands or data, and may store resulting data into a non-volatile memory 134. According to one embodiment, the processor 120 may include a main processor 121 (e.g., a central processing unit or an application processor), and an auxiliary processor 123, which operates independently from the main processor 121, additionally or alternatively uses a lower power than the main processor 121, or includes an auxiliary processor 123 specialized for a designated function (e.g., a graphic processor device, an image signal processor, a sensor hub processor, or a communication processor). Here, the auxiliary processor 123 may be operated separately from the main processor 121 or in the manner of being embedded with the main processor 121.

In this case, the auxiliary processor 123 may control at least some functions or states associated with at least one of the components of the electronic device 101 (e.g., the display device 160, the sensor module 176, or the communication module 190), on behalf of the main processor 121, for example, while the main processor 121 is in an inactive (e.g., sleep) state, or together with the main processor 121 while the main processor 121 is in an active (e.g., application execution) state. According to one embodiment, the auxiliary processor 123 (e.g., an image signal processor or a communication processor) may be implemented as some of other functionally related components (e.g., camera module 180 or communication module 190). The memory 130 may store various data used by at least one component (e.g., the processor 120 or the sensor module 176) of electronic device 101, for example, software (e.g., the program 140), and input or output data for commands which are associated with the software. The memory 130 may include, for example, a volatile memory 132 or a non-volatile memory 134.

The program 140 may be software stored in the memory 130 and may include, for example, an operating system 142, middleware 144, or application 146.

The input device 150 is a device from the outside (e.g., the user) for receiving commands or data to be used in a component (e.g., the processor 120) of the electronic device 101, and may include, for example, a microphone, a mouse, or a keyboard.

The sound output device 155 is a device for outputting a sound signal to the outside of the electronic device 101. The sound output device 155 may include, for example, a speaker for general use such as multimedia reproduction or sound reproduction and a receiver used only for telephone reception. According to one embodiment, the receiver may be formed integrally with or separately from the speaker.

The display device 160 is a device for visually providing information to a user of the electronic device 101 and may include, for example, a display, a hologram device, or a projector and a control circuit for controlling the corresponding device. According to one embodiment, the display device 160 may include a touch circuit or a pressure sensor capable of measuring the intensity of the pressure for touch.

The audio module 170 may bidirectionally convert sound and electrical signals. According to one embodiment, the audio module 170 may acquire sound through the input device 150 or may output sound through the sound output device 155 or an external electronic device (e.g., the electronic device 102 (e.g., a speaker or headphone)) connected with the electronic device 101 in a wireless or wired manner.

The sensor module 176 may generate an electrical signal or a data value corresponding to an internal operating state (e.g., power or temperature) of the electronic device 101 or an external environmental condition. The sensor module 176 may include, for example, a gesture sensor, a gyro sensor, an atmospheric pressure sensor, a magnetic sensor, an acceleration sensor, a grip sensor, a proximity sensor, a color sensor, an infrared sensor, or an illuminance sensor.

The interface 177 may support a designated protocol that may be connected to an external electronic device (e.g., the electronic device 102) in a wired or wireless manner. According to one embodiment, the interface 177 may include a High Definition Multimedia Interface (HDMI), a Universal Serial Bus (USB) interface, an SD card interface, or an audio interface.

The connection terminal 178 may be a connector capable of physically interconnecting the electronic device 101 and an external electronic device (e.g., the electronic device 102), such as an HDMI connector, a USB connector, an SD card connector, or an audio connector (e.g., a headphone connector). In certain embodiments, the electronic device 100 can be connected to a power adaptor for charging the battery 189 and an external electronic device simultaneously. The processor 120 can determine whether the electronic device 100 is connected to just the external electronic device, just the power adaptor, both, or neither, and control a switching circuit.

The haptic module 179 may convert an electrical signal into a mechanical stimulus (e.g., vibration or motion) or an electrical stimulus that the user can perceive through a tactile or kinesthetic sense. The haptic module 179 may include, for example, a motor, a piezoelectric element, or an electrical stimulation device.

The camera module 180 is a device that is capable of capturing, for example, a still image and a video image. According to one embodiment, the camera module 180 may include one or more lenses, an image sensor, an image signal processor, or a flash.

The power management module 188 is a module for managing power supplied to the electronic device 101, and may be configured as at least a part of, for example, a Power Management Integrated Circuit (PMIC).

The battery 189 is a device for supplying power to at least one component of the electronic device 101 and may include, for example, a non-rechargeable primary battery, a rechargeable secondary battery, or a fuel cell.

The communication module 190 may establish a wired or wireless communication channel between the electronic device 101 and an external electronic device (e.g., the electronic device 102, the electronic device 104, or the server 108) and may support communication via the established communication channel. The communication module 190 may include a processor 120 (e.g., an application processor) and one or more communication processors, which are independently operated and support wired communication or wireless communication. According to one embodiment, the communication module 190 may include a wireless communication module 192 (e.g., a cellular communication module, a short range wireless communication module, or a Global Navigation Satellite System (GNSS) communication module) or a wired communication module 194 (e.g., a Local Area Network (LAN) communication module or a power line communication module), and may communicate with an external electronic device via a first network 198 (e.g., a short-range communication network, such as Bluetooth, Wi-Fi direct, or Infrared Data Association (IrDA)) or a second network 199 (e.g., a long-range communication network, such as a cellular network, the Internet, or a computer network (e.g., a LAN or a WAN)), using a corresponding communication module among the above-mentioned communication modules. Various types of communication modules 190 described above may be implemented as a single chip or may be implemented as separate chips, respectively.

According to one embodiment, the wireless communication module 192 may identify and authenticate the electronic device 101 within the communication network using the user information stored in the subscriber identification module 196.

The antenna module 197 may include one or more antennas configured to transmit/receive signals or power to/from the outside. According to one embodiment, the communication module 190 (e.g., the wireless communication module 192) may transmit/receive signals to/from an external electronic device via an antenna suitable for the communication scheme thereof.

Among the components described above, some components may be connected to each other via a communication scheme (e.g., a bus, a General-Purpose Input/Output (GPIO), a Serial Peripheral Interface (SPI), or a Mobile Industry Processor Interface (MIPI)) and may exchange signals (e.g., commands or data) therebetween.

According to one embodiment, the commands or data may be transmitted or received between the electronic device 101 and the external electronic device 104 via the server 108 connected to the second network 199. Each electronic device 102 may be of a type, which is the same as or different from the electronic device 101. According to one embodiment, all or some of the operations executed in the electronic device 101 may be executed in another external electronic device or a plurality of external electronic devices. According to one embodiment, in the case where the electronic device 101 should perform a certain function or service automatically or by a request, the electronic device 101 may request some functions, which are associated with the function or service, from an external electronic device, instead of, or in addition to, executing the functions or the service by itself. The external electronic device, which receives the request, may execute the requested functions or additional functions, and may transmit the results to the electronic device 101. The electronic device 101 may provide the requested functions or services by processing the received results as they are or additionally. For this purpose, for example, a cloud computing technique, a distributed computing technique, or a client-server computing technique may be used.

The electronic device 101 can either be connected between a power supply and an external electronic device, or act as the external electronic device. Various embodiments disclosed herein provide a method and electronic device for controlling power between electronic devices, in which even when an external electronic device (e.g., a smart phone) in that is OFF is connected to an electronic device, the electronic device may be turned ON by a power supply connected to the electronic device, and the power of the external electronic device may be controlled by the electronic device that is turned ON.

Figure 2:
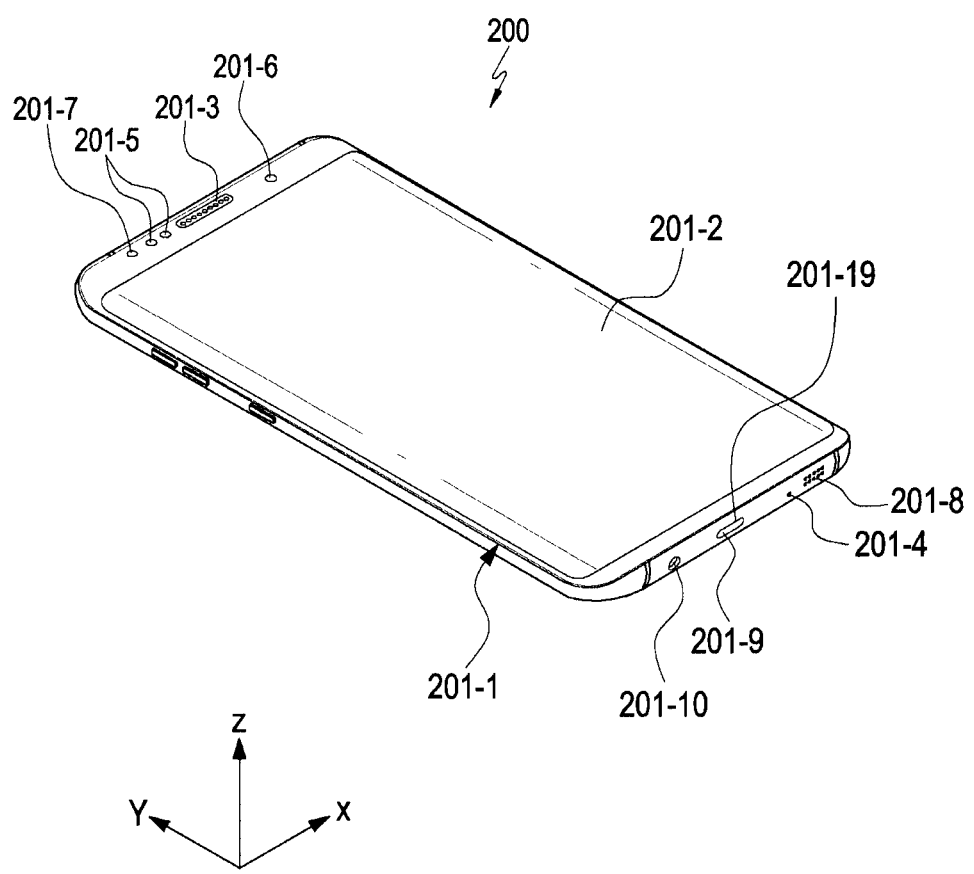
FIG. 2 is a perspective view illustrating an external electronic device according to various embodiments.
Figure 3:
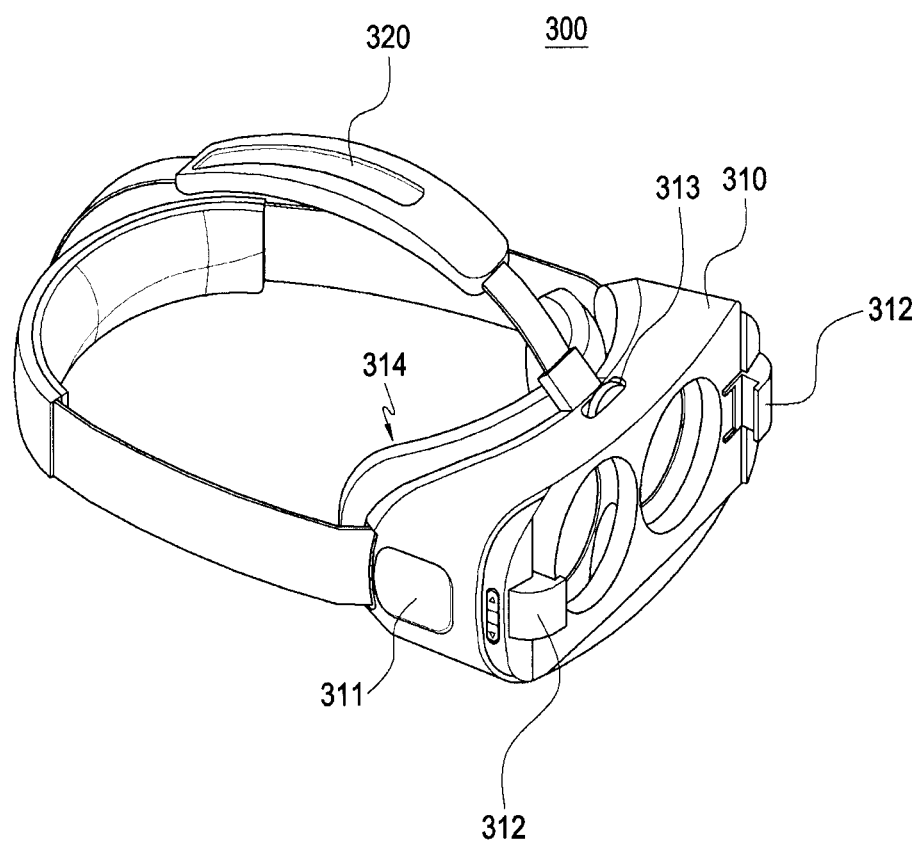
FIG. 3 is a perspective view illustrating a structure of an electronic device comprising a HMD device according to various embodiments.
Figure 5:
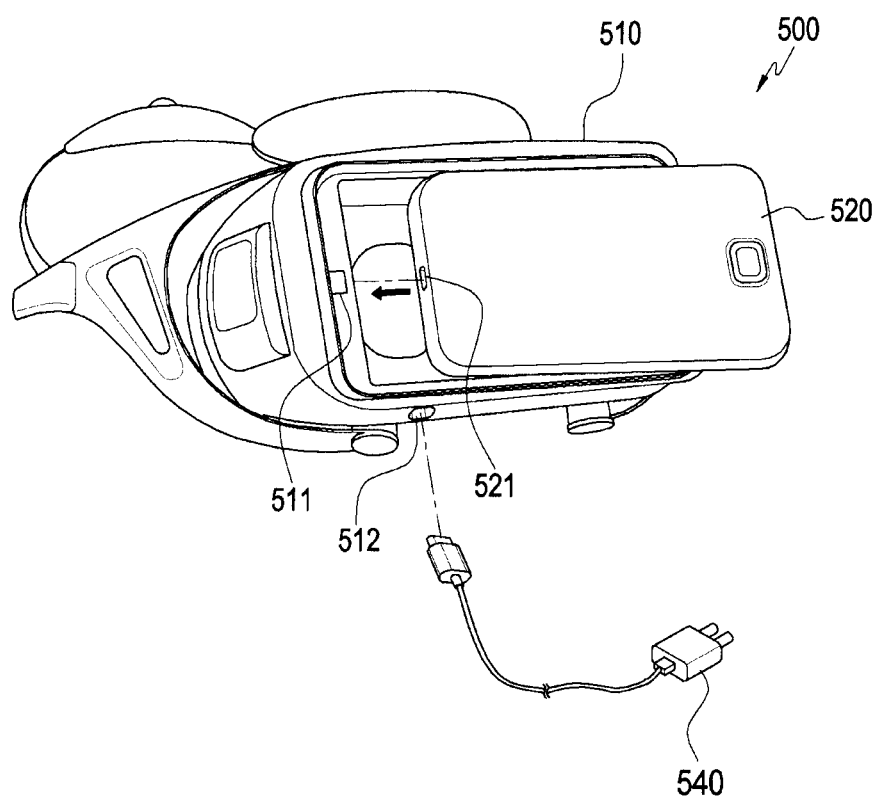
FIG. 5 is a view illustrating an example in which an external electronic device is mounted on the HMD device according to various embodiments.
Figure 11:
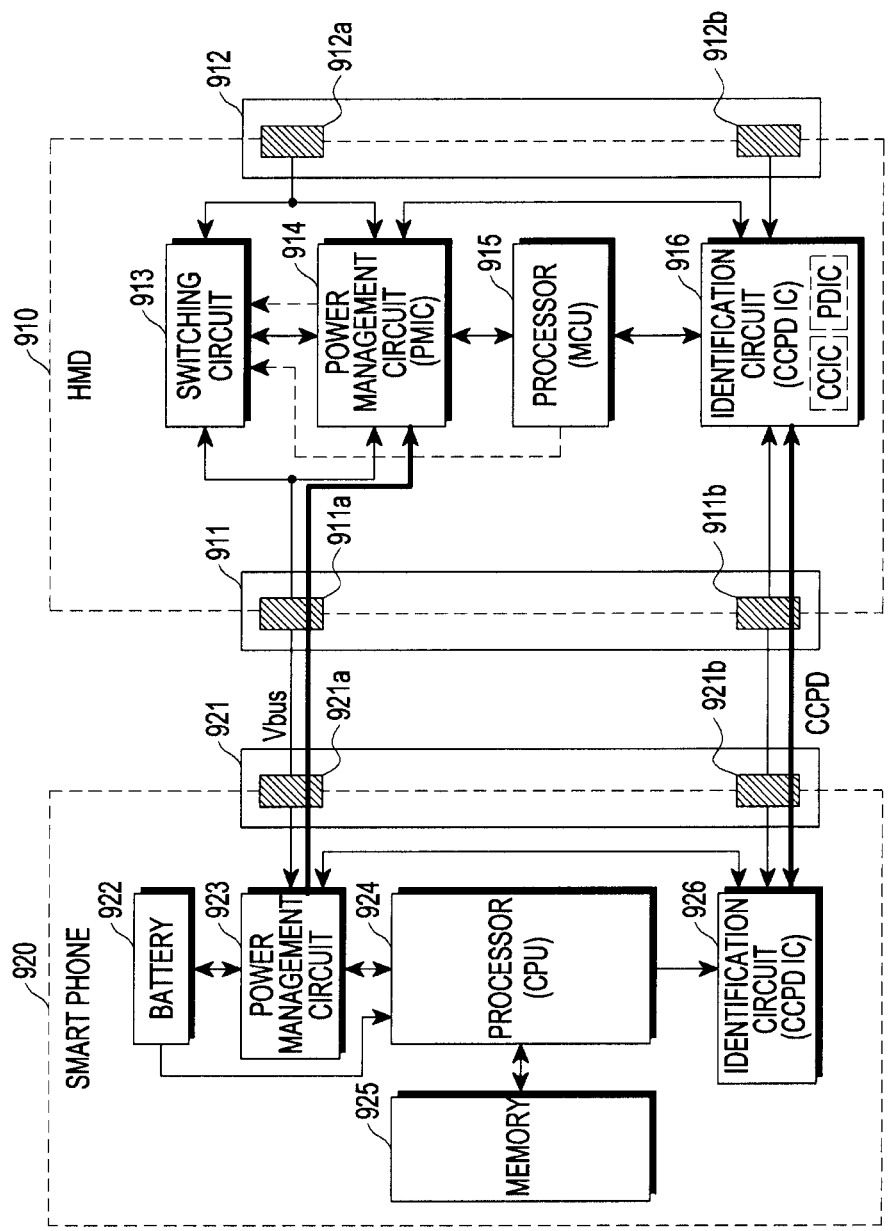
FIG. 11 is a diagram illustrating a detailed structure of the system according to various embodiments.
Figure 12:
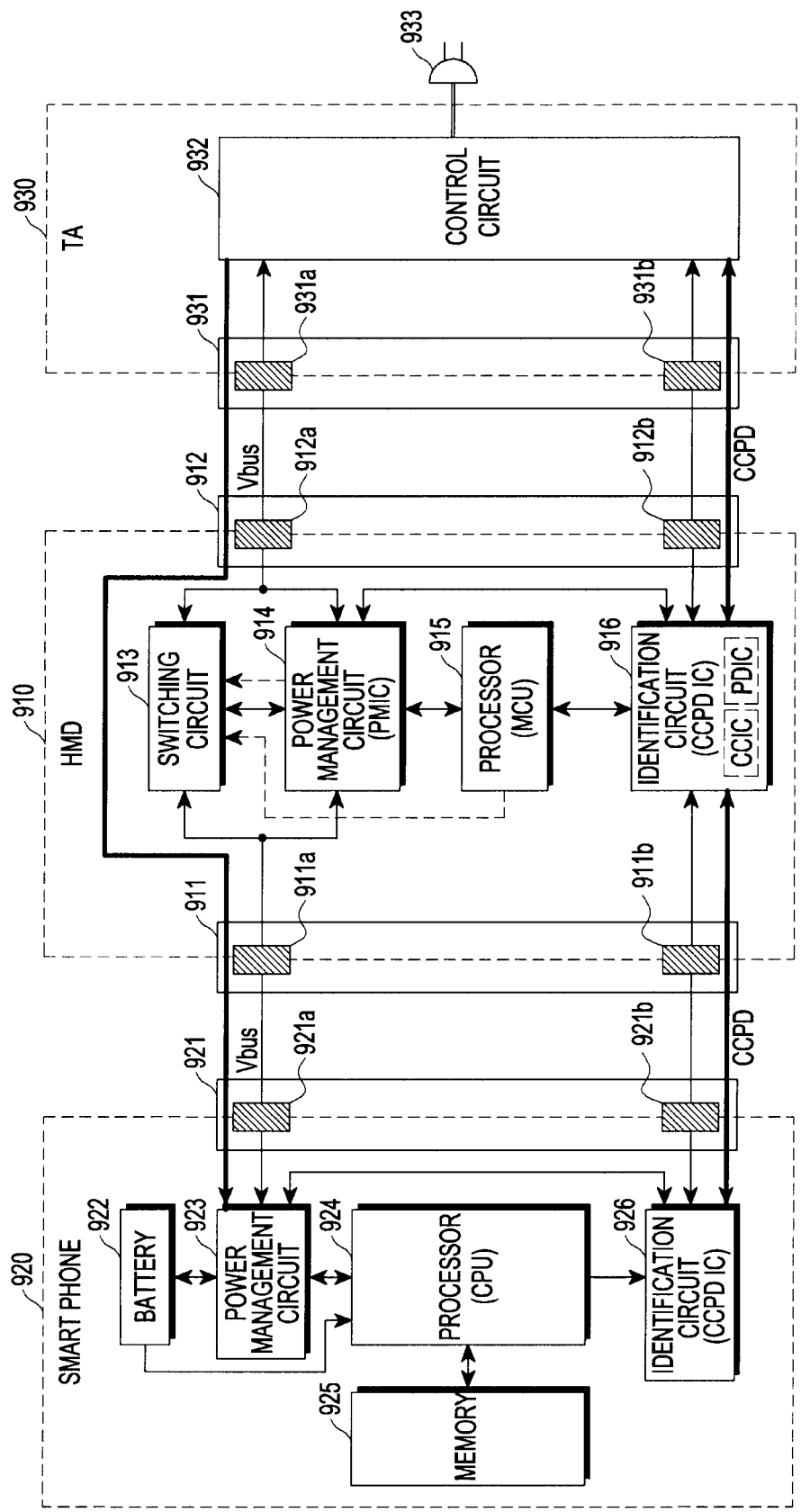
FIG. 12 is a diagram illustrating a detailed structure of the system according to various embodiments.
Figure 13:
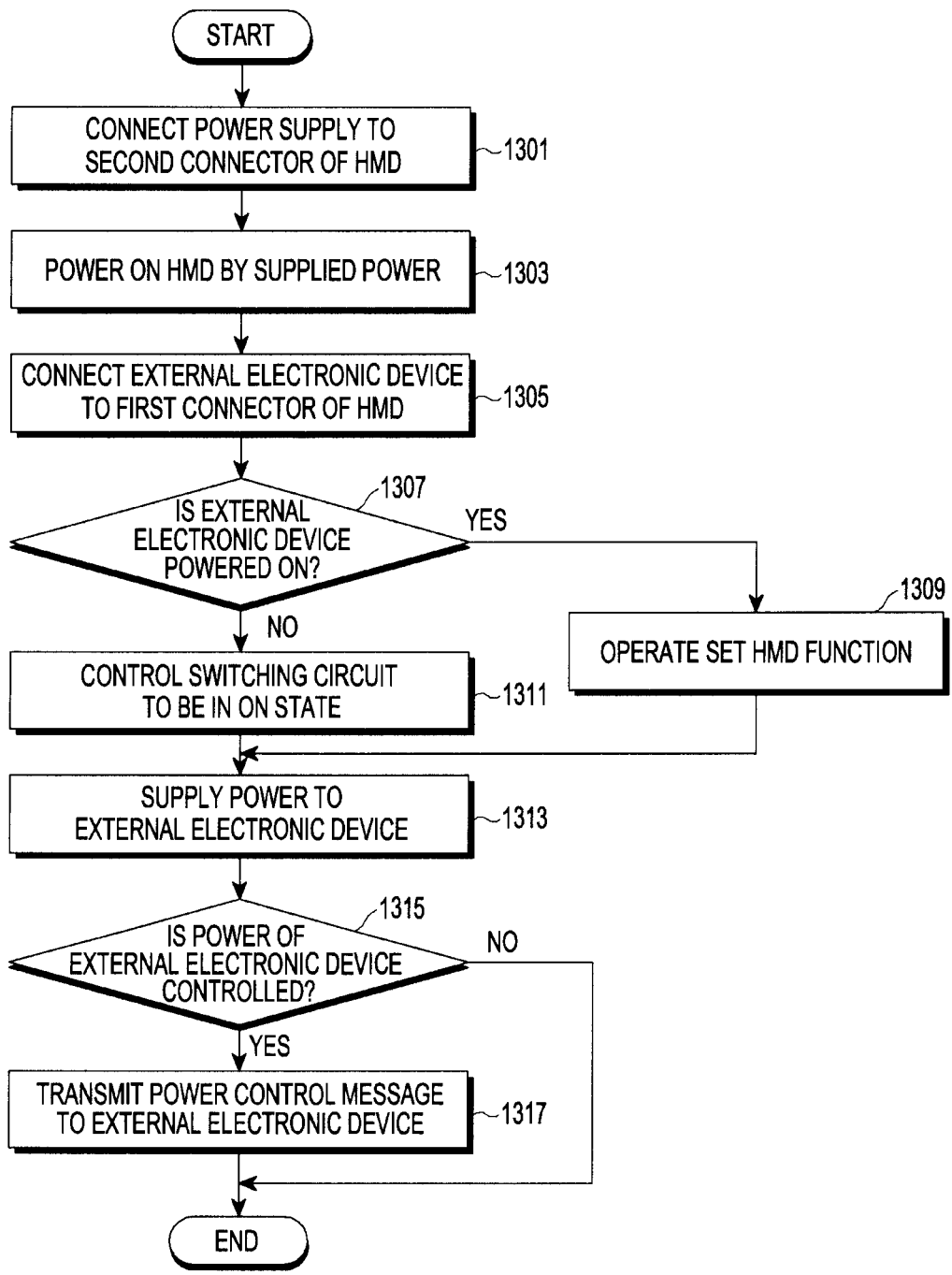
FIG. 13 is a flowchart illustrating a power control procedure between electronic devices according to various embodiments.
Figure 14:
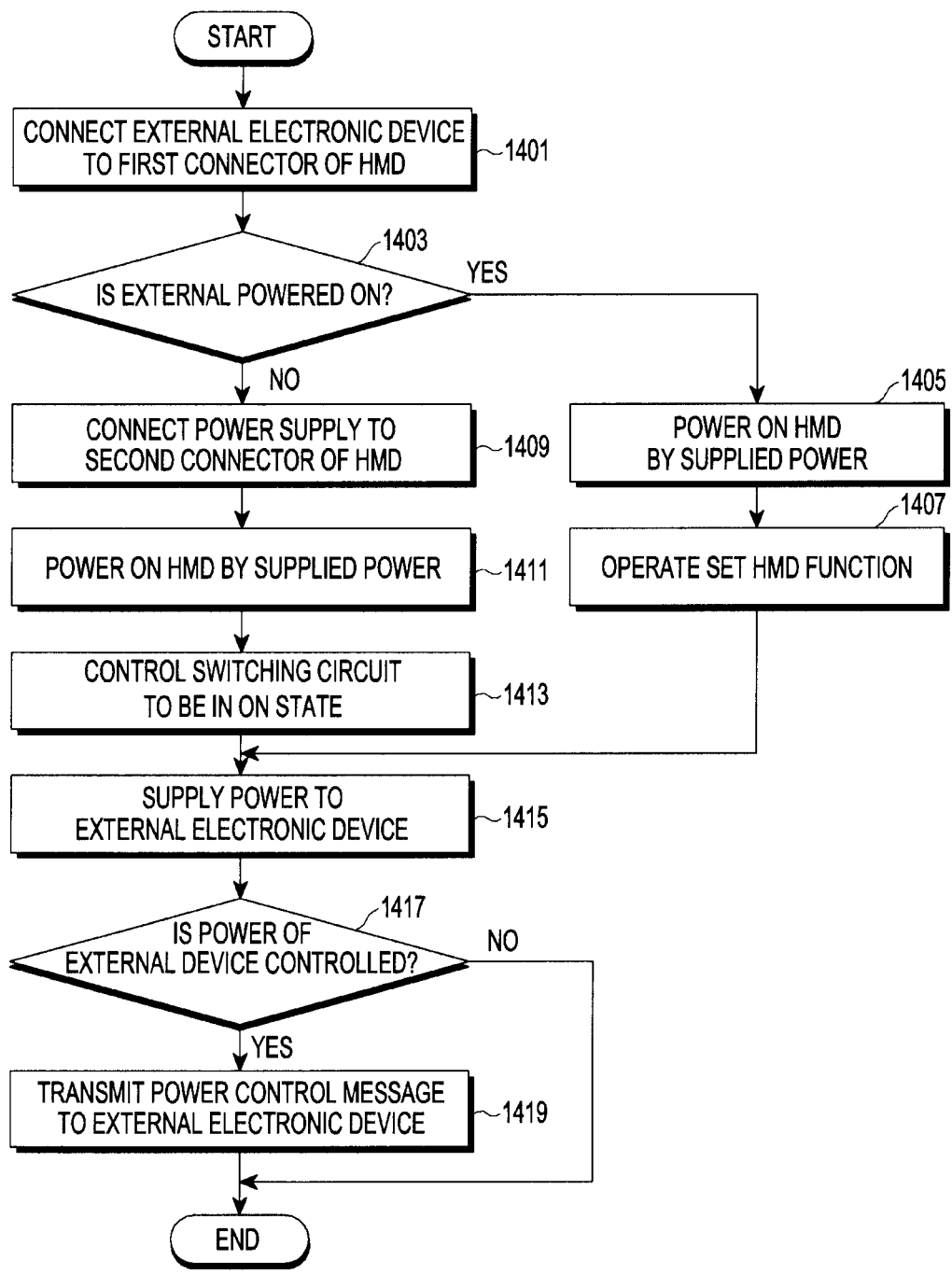
FIG. 14 is a flowchart illustrating a power control procedure between electronic devices according to various embodiments.
Figure 15:
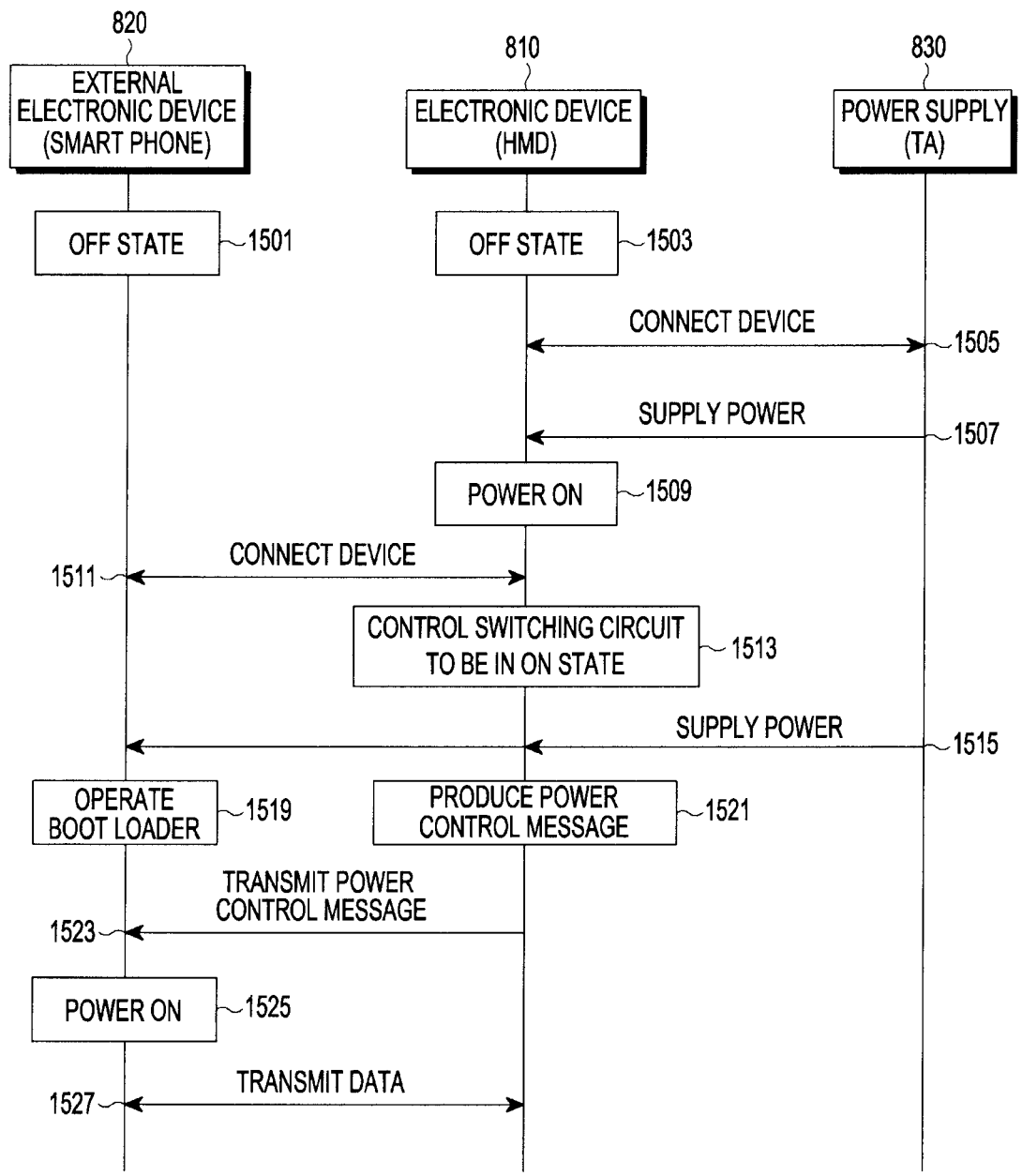
FIG. 15 is a signal flowchart illustrating a power control procedure between electronic devices according to various embodiments.
Figure 16:
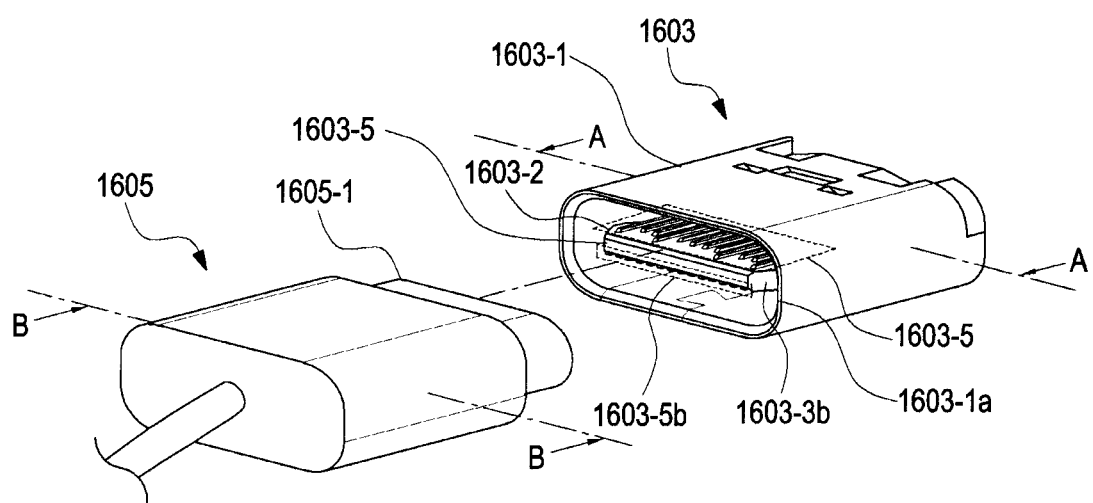
FIG. 16 is a perspective view illustrating a detailed structure of a connector according to various embodiments.
Figure 17:
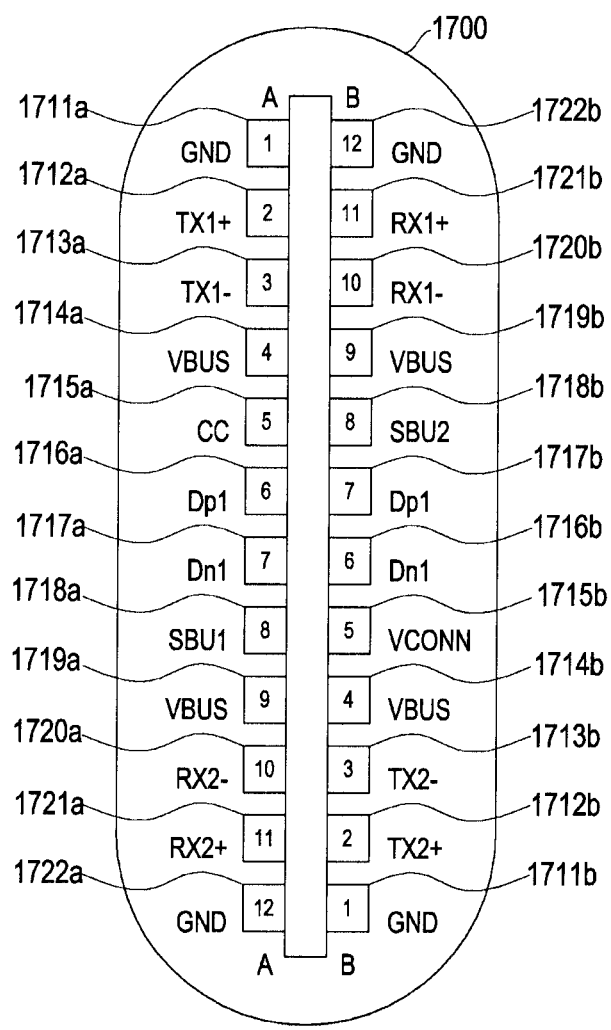
FIG. 17 is a view illustrating a detailed structure of respective pins that constitute the connector according to various embodiments.

FIG. 2 will describe an external electronic device comprising a smartphone according to various embodiments. FIG. 3 will describe an electronic device comprising a Head Mounted Display (HMD) according to various embodiments. FIG. 5 describes connection of the HMD (electronic device) connected to an external electronic device (smartphone) and a power supply. FIG. 8-12 describe an apparatus for where the external electronic device that is OFF is connected to an electronic device that may be turned ON by a power supply connected to the electronic device, and the power of the external electronic device may be controlled by the electronic device that is turned ON. FIGS. 13-15 describe methods for doing the same. FIGS. 16-18 describe connectors that can be used by the electronic device and the external electronic device.

External Electronic Device (Smartphone)

FIG. 2 is a perspective view illustrating the external electronic device according to various embodiments, although in other embodiments, FIG. 2 can act as the electronic device. Referring to FIG. 2, in an orthogonal coordinate system of three axes, an "X-axis" may correspond to the width direction of an electronic device 200 (e.g., the electronic device 101 or the electronic device 102 of FIG. 1), a "Y-axis" may correspond to the length direction of the electronic device 200, and a "Z-axis" may correspond to the thickness direction of the electronic device 200.

The external electronic device 200 may include a housing 201-1. According to one embodiment, the housing 201-1 may be formed of a conductive material and/or a non-conductive material. According to various embodiments, the external electronic device 200 may include a touch screen display 201-2 (e.g., the display device 160 of FIG. 1), which is disposed so that at least a partial region of the housing 201-1 is exposed and visible outside the housing 201-1. According to one embodiment, the touch screen display 201-2 may include a pressure sensor so as to operate as a pressure-responsive touch screen display. According to various embodiments, the external electronic device 200 may include a speaker 201-3, which is disposed in the housing 201-1 of the electronic device 200 and configured to output the voice of another party during a phone call. According to one embodiment, the external electronic device 200 may include a microphone device 201-4, which is disposed in the housing 201-1 and configured to transmit the user's voice to the other part during the phone call. According to one embodiment, the external electronic device 200 may include an ear jack connector 201-10, which is disposed in the housing 201-1 and configured to insert an ear jack of an ear set thereinto.

According to various embodiments, the external electronic device 200 may include various components, which are disposed to be exposed in the touch screen display 201-2, or in a manner of performing functions through the window but not being visibly exposed, in order to perform various functions of the external electronic device 200. According to one embodiment, the components may include at least one sensor module 201-5. The sensor module 201-5 may include, for example, an illuminance sensor (e.g., an optical sensor), a proximity sensor (e.g., an optical sensor), an infrared sensor, an ultrasonic sensor, a fingerprint recognition sensor, or an iris recognition sensor. According to one embodiment, the components may include a camera device 201-6. According to one embodiment, the components may include an indicator 201-7 (e.g., an LED device) for visually providing status information of the electronic device to the user. According to one embodiment, at least one of these components may be disposed to be exposed through at least a partial region of the second plate 201-1.

According to various embodiments, the external electronic device 200 may include another speaker 201-8, which is disposed on one side of the microphone device 201-4. According to one embodiment, the external electronic device may include a connector 201-9 (e.g., the connection terminal 178 of FIG. 1) which is disposed on the other side of the microphone device 201-4 and allows the external electronic device to be connected to another device. According to one embodiment, the connector 201-9 may be a socket-type connector.

According to various embodiments, an opening 201-19 may be formed in at least a partial region of the housing 201-1 in order to expose the connector 201-9, in which the connector 201-9 may be disposed in the opening 201-19. According to various embodiments, a header-type external connector may be connected to the connector 201-9 in a forward or reverse direction. According to one embodiment, the external connector can be connected to the another device, and as the connector 201-9 and the external connector are coupled to each other, the external electronic device 200 and the another device can be connected to each other. According to various embodiments, the another device may be any of various devices that can be connected to the electronic device 200. For example, the other device may include an audio device, a computer, a charger, a memory, a fan, or an antenna (e.g., a digital multimedia broadcast antenna or FM antenna). Additionally, the other device can be an electronic device such as a head mounted display (HMD).

The plurality of electronic devices 200 may operate by being interconnected with each other through wireless or wired communication. For example, a smart phone may provide contents by being fastened to a wearable device such as an HMD or the like. Hereinafter, a situation in which a smart phone and a wearable device such as an HMD or the like are fastened to each other so as to operate will be described.

An HMD device (a wearable device) according to various embodiments may be a device for displaying an image in the state of being in contact with both eyes of the user or being worn by the user. The HMD device may provide at least one of a see-through function for providing Augmented Reality (AR) or a see-closed function for providing Virtual Reality (VR). The see-through function may mean a function of providing additional information or an image as a single image in real time while transmitting actual external images to the user's eyes through a display. The see-closed function may mean a function of providing only the contents provided through the display, as an image.

Hereinafter, in the description of operations performed in relation to the power reception and supply of the HMD device, the electronic device 200 may be interpreted as an external electronic device connected to an electronic device comprising a HMD device. In addition, the power supply may be interpreted as an external electronic device or an external device that supplies power to the HMD device and an electronic device.

Electronic Device (Head Mounted Display)

FIG. 3 is a perspective view illustrating an electronic device comprising a HMD device according to various embodiments.

Referring to FIG. 3, the HMD device 300 may include a main frame 310 configured to detachably mount an electronic device 200 such as a smart phone thereon, and a mounting unit 320 connected to the main frame 310 and configured to fix the main frame 310 to a portion of the user's body.

The main frame 310 may include a user input module 311 capable of controlling the external electronic device 200, a first interface unit 312 connected to the external electronic device 200, a display position adjustment unit 313, a proximity sensor 314, and a second interface unit (not illustrated) connected to an external power supply or another external input device.

For example, the user input module 311 may include at least one of a physical key, a physical button, a touch key, a joystick, a wheel key, a touch pad, etc. When the user input module 311 is a touch pad, the touch pad may be disposed on a side face of the main frame 310. The touch pad may include a control object (e.g., a Graphical User Interface (GUI) for controlling sound or image) indicating the functions of the external electronic device 200 or the HMD device 300.

The first interface unit 312 may support the HMD device 300 to communicate with the external electronic device 200.

The first interface unit 312 may be connected to the interface unit (e.g., a USB port) of the external electronic device 200, and may transmit a user input signal generated by the user input module 311 to the external electronic device 200. For example, the first interface unit 312 may transmit a user input signal (e.g., a touch input) received from the user input module 311 to the external electronic device 200. The external electronic device 200 may perform a function corresponding to the user input signal. For example, the external electronic device 200 may adjust the volume or reproduce an image in response to the touch input.

The proximity sensor 314 may sense the proximity of an object in a non-contact manner and may detect the position of the object. For example, when an object (e.g., a part of the user's body) is detected within a predetermined sensing distance, the proximity sensor 314 may transmit a sensed signal to the main control unit of the HMD device 300. The proximity sensor 314 may not send any signal to the main control unit unless an object is detected within a predetermined sensing distance. The main control unit may determine that the user wears the HMD device 300 on the basis of the signal detected by the proximity sensor 314. The proximity sensor 314 may be disposed on the upper portion of the inner side of the main frame 310 such that when the HMD device 300 is worn, the proximity sensor 314 can be located close to the user's forehead in order to easily determine whether or not the HMD device 300 is worn.

Although a proximity sensor is described herein, other sensors capable of determining whether or not the HMD device 300 is worn may be used according to the embodiment. For example, at least one of an acceleration sensor, a gyro sensor, a geomagnetic sensor, a gesture sensor, a biometric sensor, a touch sensor, an illuminance sensor, and a grip sensor may be mounted on the main frame 310.

The main frame 310 may be configured to be detachable from an external device such as the electronic device 200. For example, the main frame 310 may include a space, a structure, or a cavity configured to accommodate the electronic device 200 therein. A portion forming the space in the main frame 310 may include an elastic material. At least a part of the portion forming the space of the main frame 310 may be made of a flexible material such that the size or the volume of the space can be changed according to devices of various sizes accommodated in the space.

The rear face (inner face) of the main frame 310 may further include a face contact portion configured to be in contact the user's face, and a lens assembly including at least one lens at a location facing the user's two eyes may be inserted into a portion of the face contact portion. In the lens assembly, a display or a transparent/translucent lens may be implemented integrally with the face contact portion, or may be implemented to be detachably mountable to the face contact portion. A portion of the face contact portion may include a nose recess having a shape into which the user's nose can be inserted.

In one embodiment, the main frame 310 may be made of a material, such as a plastic material, that allows the user to feel comfortable and is able to support the external electronic device 200. In another embodiment, the main frame 310 may be made of at least one of glass, ceramic, and a metal (e.g., aluminum) or a metal alloy (e.g., steel, stainless steel, a titanium or magnesium alloy) in order to ensure a strength or a beautiful appearance.

The mounting unit 320 may be worn on a portion of the user's body. The mounting unit 320 may be configured with a band made of an elastic material. In other embodiments, the mounting unit 320 may include eyeglass temples, a helmet, a strap, or the like.

Figure 4:
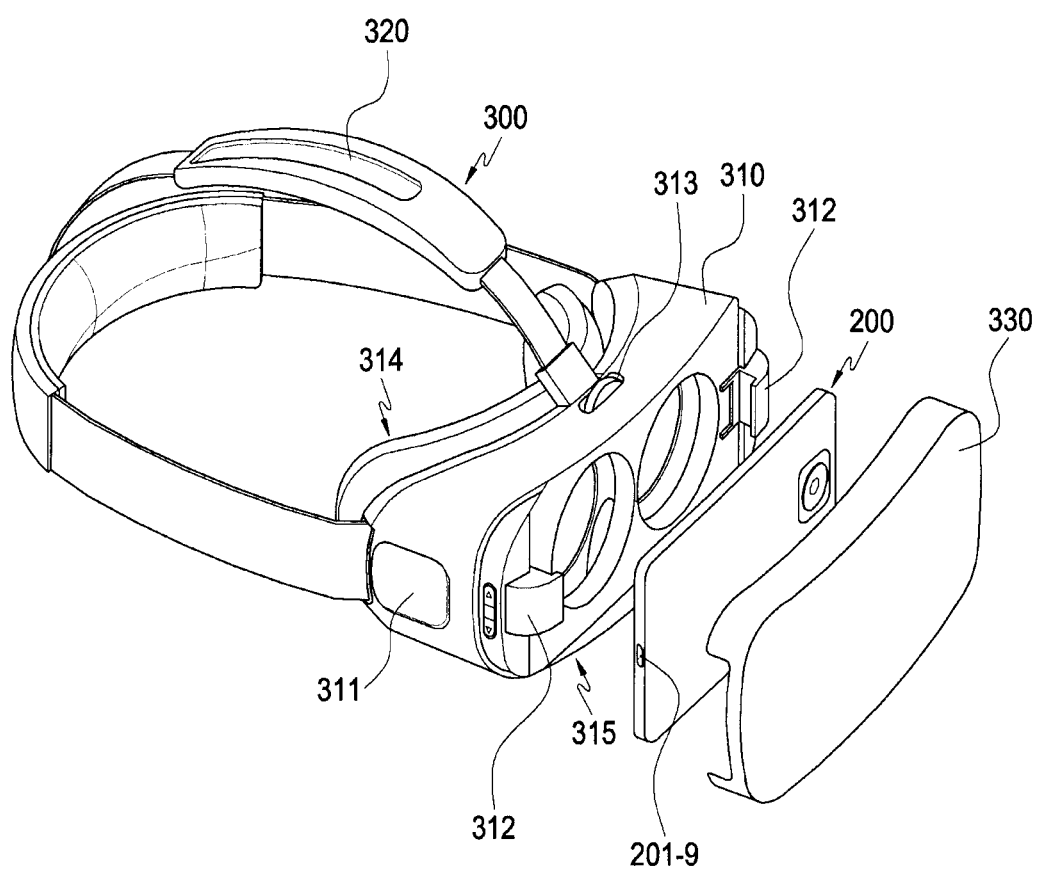
FIG. 4 is a view illustrating an example in which an external electronic device is mounted on the HMD device according to various embodiments.

FIG. 4 is a view illustrating how to couple the HMD device 300 and an external electronic device 200 (e.g., a smart phone) according to various embodiments.

Referring to FIG. 4, the HMD device 300 may further include a cover 330 configured to fix the external electronic device 200 coupled to the mainframe 310. The cover 330 may be physically coupled to the main frame 310 in the form of, for example, a hook, or may be coupled in the same manner as a magnet or an electromagnet. The cover 330 may prevent the external electronic device 200 from being separated from the main frame 310 by the movement of the user, and may protect the external electronic device 200 from an external impact.

The main frame 310 and the display of the external electronic device 200 may be coupled to face each other. The user may connect the connector 201-9 of the external electronic device 200 to the first interface unit 312 of the main frame 310 and may then fit the cover 330 onto the HMD device 300 and the external electronic device 200.

According to various embodiments, a connector 315, to which an external device (e.g., a power supply) can be connected, may be disposed at one side (e.g., the lower portion) of the main frame 310 of the HMD device 300.

Hereinafter, an example in which an external electronic device (e.g., a smart phone) is mounted on the HMD device will be described with reference to FIGS. 5 and 6.

FIG. 5 is a view illustrating an exemplary HMD device 500 according to various embodiments. Referring to FIG. 5, the HMD device 500 may be, for example, the electronic device 101, 102, or 104 of FIG. 1. In addition, as described above, the HMD device 500 may provide only a function of a cradle that does not have a communication function with an electronic device 520. The HMD device 500 may include a main body and a cover.

When the external electronic device 520 is mounted on the body portion 510 of the HMD device 500, as illustrated, the cover may cover the rear edge of the external electronic device 520 so as to maintain the external electronic device 520 in the mounted state and may be fixed to the HMD device 500. The HMD device 500 may have a support that can be used by the user to wear the HMD device 500 on his/her head.

In addition, the body 510 of the HMD device 500 may be provided with lenses at positions corresponding to the respective eyes of the wearer. The wearer is able to see the screen of the display (not illustrated) of the electronic device 520 through the lenses in the state in which the electronic device 520 is mounted on the body 510 of the HMD device 500. The HMD device 500 may be a mechanical structure that can detachably mount the electronic device 520 as illustrated.

When the external electronic device 520 is mounted, the HMD device 500 may be connected to the external electronic device 520 via an interface such as a USB so as to communicate with the electronic device 520. The external electronic device 520 may control the function corresponding to the input in response to the input received from the HMD device 500. For example, the external electronic device 520 may adjust the volume or control a screen (e.g., a video reproduction screen in a virtual reality mode) in response to the received input. For example, when the external electronic device 520 is mounted on the HMD device 500, the connector 521 of the external electronic device 520 is electrically connected to the connector 511

(e.g., the first connector) of the HMD device 500, so that the devices can communicate with each other. The first connector 511 can include a power supply terminal and a data communication terminal.

The second connector 512 provided in at least a part of the HMD device 500 (for example, the lower portion of the device) may be connected to an external power supply or another external input device. The second connector 512 can include a a power supply terminal and a data communication terminal. For example, when the second connector 512 is connected to the external power supply 540, the HMD device 500 may receive power from the external power supply 540. The received power may be used as the operating power of the HMD device 500 or may be transferred to the external electronic device 520 to be used as the operating power of the external electronic device 520 or to charge the external electronic device 520. Alternatively, when the second connector 512 is connected to the external input device, the HMD device 500 may receive an external input signal from the external input device and may transmit the external input signal to the main control unit of the HMD device 500.

However, a problem can occur if the external power supply 540 is connected to an HMD device 500, where power is not supplied to the HMD device or an external electronic device (e.g., a smart phone) connected to the HMD device when the HMD device is OFF. If in order for the HMD device to be turned ON, the HMD device 500 must receive power from the external electronic device 200 connected to the HMD device 500 and the HMD device must be booted, when the external electronic device is in the OFF state, even if both the power supply and the external electronic device are connected to the HMD device, the HMD device is not booted. Thus, it may not be possible to supply power to the HMD device or the external electronic device or to control the power of the external electronic device.

Various embodiments disclosed herein provide a method and electronic device for controlling power between electronic devices, in which even when an external electronic device (e.g., a smart phone) 200 that is OFF is connected to an electronic device (e.g., an HMD device) 500, the electronic device 500 may be turned ON by a power supply connected to the electronic device 500, and the power of the external electronic device 200 may be controlled by the electronic device 500 in the ON state.

Figure 6:
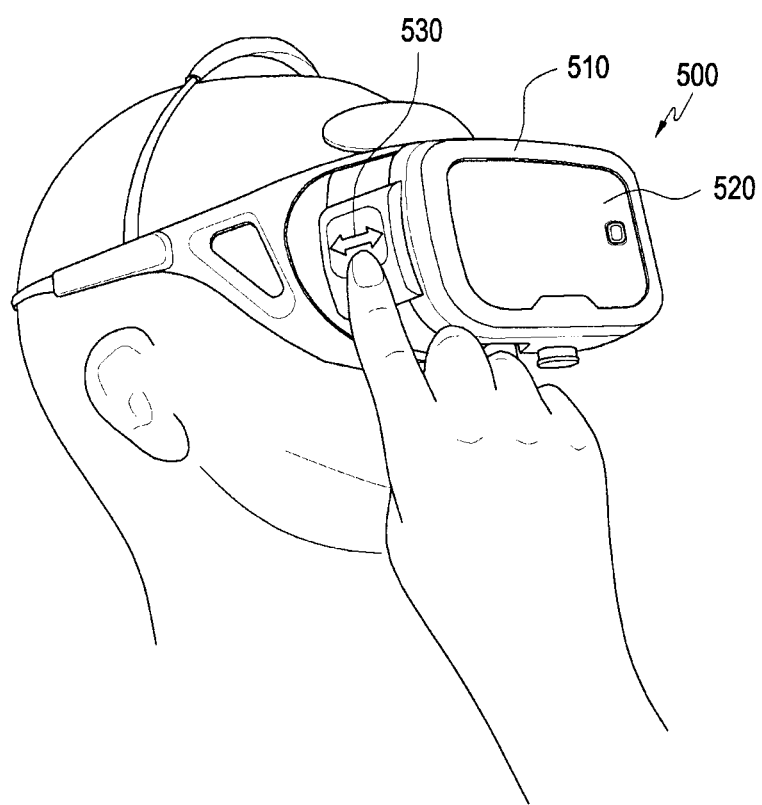
FIG. 6 is a view illustrating an example in which a user wears the HMD device on which an external electronic device is mounted according to various embodiments.

FIG. 6 is a view illustrating an example in which the user wears the HMD device 500 equipped with the external electronic device 520 according to various embodiments. As illustrated in FIG. 6, the user may wear the HMD device 500 equipped with the external electronic device 520 on his/her head. The wearer can see the screen of the display of the mounted electronic device 520 through the lenses provided in the HMD device 500.

In addition, as illustrated in FIG. 6, the functions of the HMD device 500 or the external electronic device 520 may be controlled through the touch pad 530 provided on the side face of the body 510 of the HMD device 500. According to various embodiments, the information display in the virtual reality mode may be implemented in a smart phone, a mobile phone, or the like, and may also be implemented in the HMD device 500 (e.g., an HMD device).

Figure 7:
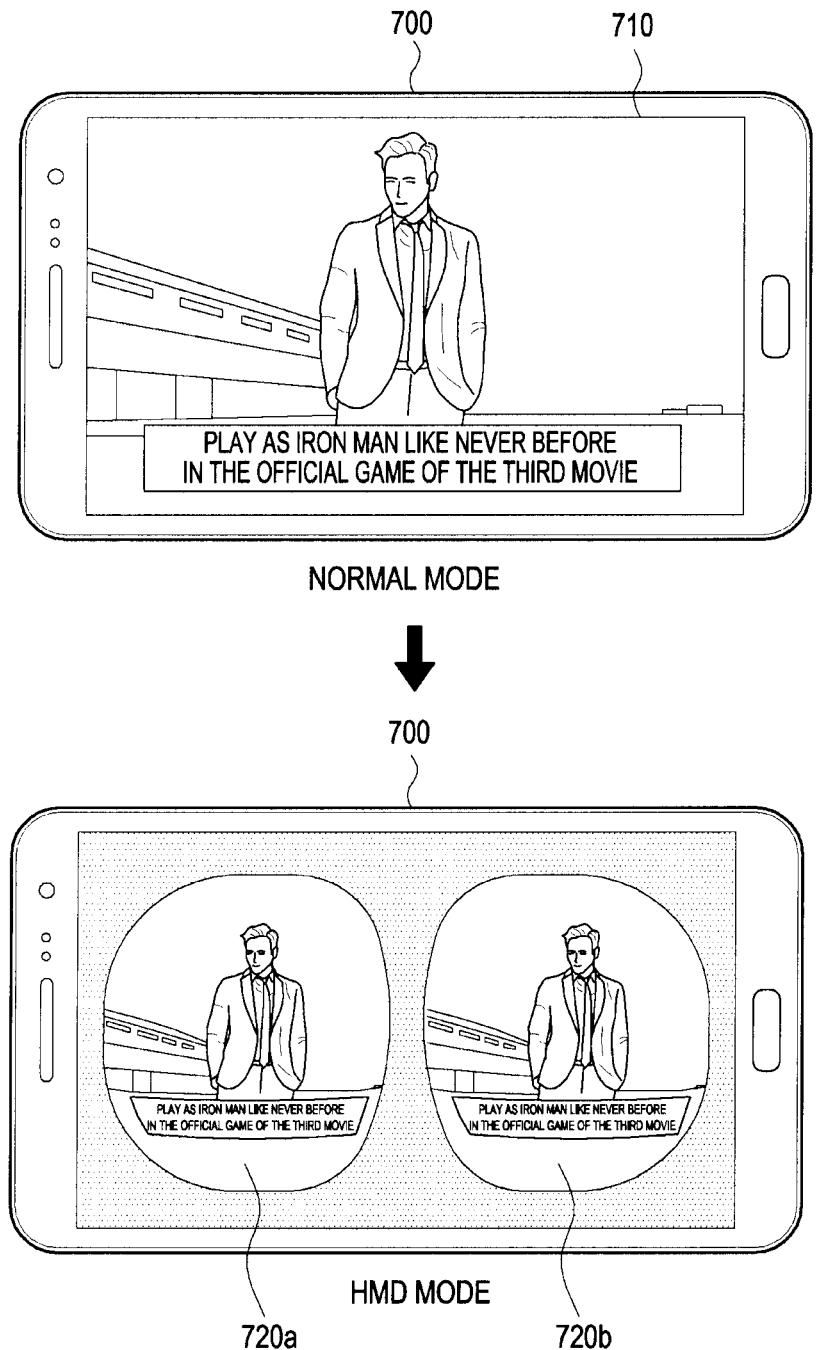
FIG. 7 is a view illustrating a screen mode of an external electronic device according to various embodiments.

FIG. 7 is a view illustrating a screen mode of an external electronic device according to various embodiments. Referring to FIG. 7, an external electronic device 700 may be the electronic device 200 or 520 of FIG. 2, FIG. 4, or FIG. 5. When the external electronic device 700 operates in a normal mode, the external electronic device 700 may display one operation screen 710 as illustrated in the upper portion of FIG. 7.

According to various embodiments, when the external electronic device 700 is mounted on the HMD device, the external electronic device 700 may operate in a virtual reality mode (e.g., an HMD mode) as illustrated in the lower portion of FIG. 7. When the external electronic device 700 operates in the virtual reality mode, the external electronic device 700 may display a screen 720a corresponding to the left eye of the user and a screen 720b corresponding to the right eye to be differentiated from each other. In the screen of the virtual reality mode, one image may be displayed in the state of being divided into two images 720a and 720b.

Examples of the above-mentioned electronic device, HMD device, or HMD device exemplify devices in which image data can be displayed according to embodiments, and the various embodiments are not limited to the above-mentioned devices. For example, embodiments may be applied to any type of devices capable of displaying image data according to various embodiments.

Hereinafter, the structure of a system according to various embodiments will be described in detail with reference to FIGS. 8 to 12, and power supply control procedures according to various embodiments will be described with reference to FIGS. 13 to 15.

Figure 8:
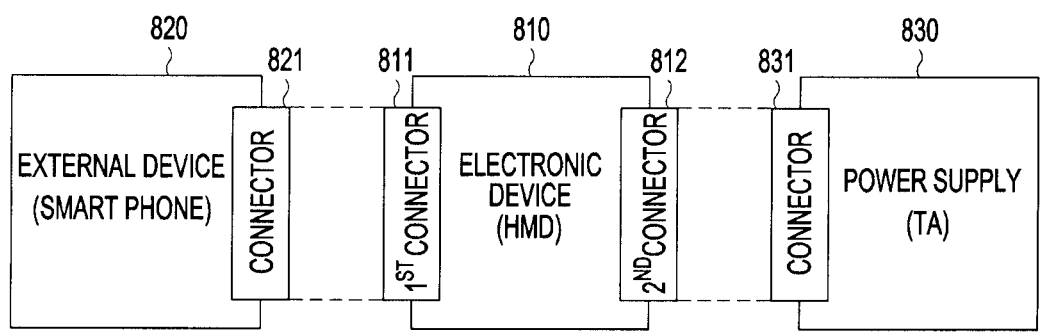
FIG. 8 is a block diagram illustrating a schematic structure of a system according to various embodiments.

FIG. 8 is a block diagram illustrating a schematic structure of a system according to various embodiments wherein an electronic device 810 that is OFF can be turned ON when power is transferred from either the external device 820 or the power supply 830. Referring to FIG. 8, a system according to various embodiments may include an electronic device 810 (e.g., an HMD device), an external electronic device 820 (e.g., a smartphone), and a power supply 830 (e.g., a Travel Adapter (TA)). In the following embodiments, an HMD device will be described as an example of the electronic device 810, and a smart phone will be described as an example of the external electronic device 820. However, the electronic device 810 or the external electronic device 820 is not limited to the HMD device or the smartphone.

According to various embodiments, the electronic device 810 may include a first connector 811 and a second connector 812. The electronic device 810 may be connected to the connector 821 of the external electronic device 820 through the first connector 811. The connection may be so as to transmit or receive power or to transmit/receive data. The electronic device 810 may be connected to the connector 831 of the power supply 830 via the second connector 812. The connection may be so as to transmit/receive power or to transmit/receive data.

The first connector 811 and the second connector 812 of the electronic device, the connector 821 of the external electronic device 820, and the connector 831 of the power supply 830 are not limited to a specific form, a specific type, and a specific scheme of connectors. For example, each of the connectors 811, 812, 821, and 831 according to various embodiments may be implemented as any connector that has a plurality of pins, and is capable of providing power through at least one pin, and of performing data communication with one or more other pins. For example, each of the connectors 811, 812, 821, and 831 may be a universal serial bus (USB) connector, and as a more specific example, a USB type A connector (e.g., 1.1, 2.0, 2.3, etc.), a USB type B connector, a USB type C connector, a micro USB connector, and the like.

According to various embodiments, when the electronic device 810 and the external electronic device 820 are connected by the connectors 811 and 821, power is transferred from the external electronic device 820 to the electronic device 810 and the power of the electronic device 810 can be turned ON from the OFF state by the supplied power. According to various embodiments, when the electronic device 810 and the power supply 830 are connected by the connectors 812 and 831, power is transferred from the power supply 830 to the electronic device 810 and the power of the electronic device 810 can be turned ON from the OFF state by the supplied power.

According to various embodiments, when the electronic device 810 is connected to the external electronic device 820 and the power supply 830 through the first connector 811 and the second connector 812, respectively, the electronic device 810 may receive power from the power supply 830 through the second connector 812 and may transmit the supplied power to the external electronic device 820 through the first connector 811.

According to various embodiments, even when the external electronic device 820 is connected to the electronic device 810, when the electronic device 810 is OFF, power may be supplied from the electronic device 810 to the external electronic device 820. Power may be supplied so that the boot loader of the external electronic device 820 can be operated. Thus the external electronic device 820 can be charged.

According to various embodiments, when the electronic device 810 is connected to the external electronic device 820 and the power supply 830 through the first connector 811 and the second connector 812, respectively, the electronic device 810 may transmit/receive data to/from the power supply 830 through the second connector 812, and may transmit/receive data to/from the external electronic device 820 through the first connector 811.

According to various embodiments, even when the external electronic device 820 is connected to the electronic device 810, when the external electronic device is OFF, a power control message may be transmitted from the electronic device 810 to the external electronic device 820 so that the power of the external electronic device 820 can be controlled (e.g., from the OFF state to the ON state). According to various embodiments, when the first connector 811 is a USB type C connector, the power control message may be transmitted using a Vender Defined Message (VDM) via a Power Delivery (PD) communication protocol.

Figure 9:
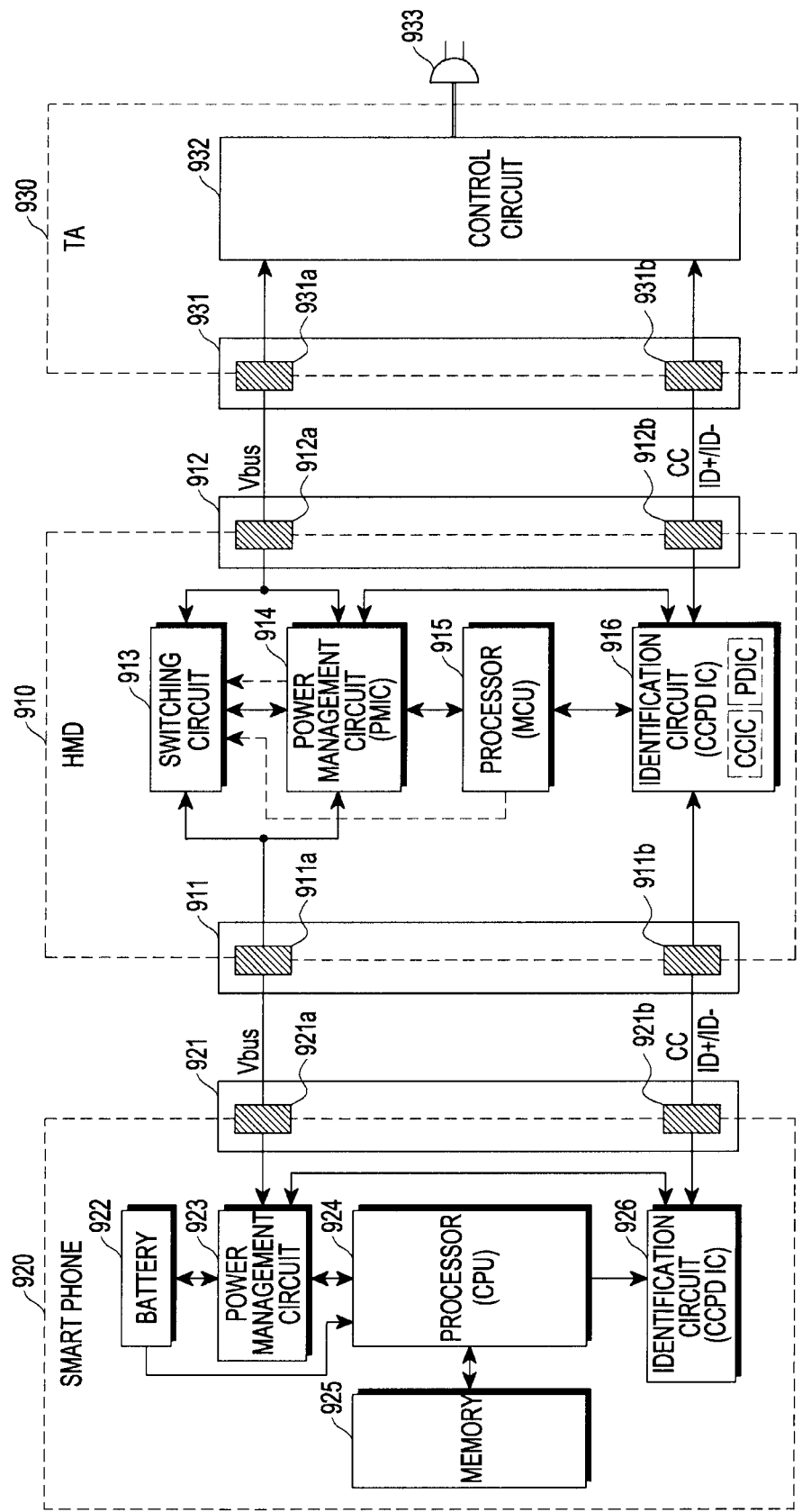
FIG. 9 is a diagram illustrating a detailed structure of the system according to various embodiments.

FIG. 9 is a diagram illustrating a detailed structure of the system according to various embodiments. Referring to FIG. 9, an electronic device 910 (e.g., an HMD device) according to various embodiments may operate in conjunction with an external electronic device 920 (e.g., a smart phone) or a power supply 930 (e.g., a TA).

The electronic device 910 can include a processor 915 that can detect whether the external electronic device 920 and/or the power supply 930 are connected, and control a switching circuit 913 based on whether only one of the external electronic device 920 and/or the power supply 930 are connected, or both the external electronic device 920 and/or the power supply 930 are connected.

When both the external electronic device 920 and the power supply 930 are connected, the processor 915 cause the switching circuit 913 to form a short, bypassing the electronic device 910. As a result, a first terminal 912*a* of the second connector 912 provides power directly to a first terminal 911*a* of the first connector 911.

When only one of the external electronic device 920 or the power supply 930 are connected, the processor 915 cause the switching circuit 913 to form an open circuit. The open circuit causes either the first terminal 911*a* of the first connector 911 or the second terminal 912*a* of the second terminal 912 to provide power to the external electronic device 920, thereby turning the external electronic device 920 ON.

The electronic device 910 may correspond to an accessory device functionally connected to the external electronic device 920. Herein, the external electronic device 920 may be referred to as a first external electronic device. The electronic device 910 may correspond to, for example, the HMD device described above. However, the electronic device 910 according to an embodiment is not limited thereto. In addition, the electronic device 910 may be implemented as a single device with, for example, the external electronic device 920 although illustrated separately from the external electronic device 920. For example, the external electronic device 920 may be located in at least a portion of the electronic device 910, or may be configured within the electronic device 910.

The external electronic device 920 may be functionally connected to the electronic device 910. For example, the external electronic device 920 may be a smart phone. However, the external electronic device 920 according to one embodiment is not limited to the smart phone. For example, the external electronic device 920 may include a mobile terminal device such as a tablet PC, a PDA, or the like.

The power supply 930 may include an auxiliary accessory device that is electrically connected to the electronic device 910. For example, the power supply 930 may be a charging device capable of supplying power. The charging device may include, for example, a notebook PC, a Travel Charger (TA), an auxiliary battery, or the like.

The electronic device 910 and the external electronic device 920 may be connected via a wired communication interface. According to various embodiments, the electronic device 910 and the external electronic device 920 may be connected via an image communication interface (e.g., a High-Definition Multimedia Interface (HDMI), a Display Port (DP) interface, a Mobile High-definition Link (MHL) interface, a USB audio video device interface, or the like). The external electronic device 920 may be a source device for generating content data (e.g., image data) and the electronic device 910 may operate as a sink device for receiving contents and outputting or reproducing the contents, and vice versa. According to various embodiments, the electronic device 910 and the external electronic device 920 may be connected via a USB communication interface. The external electronic device 920 may operate as a USB host and the electronic device 910 may operate as a USB client, and vice versa.

The electronic device 910 and the external electronic device 920 may be connected via a connector. The connector may transmit analog or digital data to and from the device. The connector may transmit power to and from the device. According to various embodiments, the connector may be a USB Type C connector. The electronic device 910 and the external electronic device 920 may exchange data and power with each other via the USB Type C connector. According to various embodiments, when connected via a USB Type C connector, the electronic device 910 and the external electronic device 920 may be connected in an alternate mode to each other. For example, a video signal of a video communication interface (e.g., DisplayPort interface of VESA) may be transmitted or received via a USB connector.

In the embodiments, the types of the wired communication interface and connector used by the electronic device 910 and the external electronic device 920 are not limited to any one type.

When the electronic device 910 is electrically connected to the external electronic device 920, the electronic device 910 can receive power from the external electronic device 920. For example, the electronic device 920 may be powered from the external electronic device 920 via a power terminal of the connector (e.g., V_BUS of a USB connector). The electronic device 910 may be driven using power supplied from the external electronic device 920.

The electronic device 910 may be powered from the power supply 9when electrically connected to the power supply 930. At this time, the electronic device 910 may be driven using the power supplied from the power supply 930, and may request the external electronic device 920 to stop supplying power. For example, when the connection of the power supply 930 is sensed, the electronic device 910 may send status information to the external electronic device 920, indicating that the power supply 930 is connected.

According to one embodiment, the status information may be transmitted to the external electronic device 920 via a data communication terminal of the connector (e.g., D+, D−, Rx, Tx, or CC terminal of the USB connector, etc.). The data communication terminal may include, for example, a positive data communication terminal (D+) and a negative data communication terminal (D−) of a USB interface. According to another example, the status information may be transmitted to the external electronic device 920 through a terminal transmitting a variable resistance signal of the connector (e.g., in a manner similar to the ID terminal of a micro USB connector).

The electronic device 910 may supply power to the external electronic device 920 when electrically connected to the power supply 930. For example, the electronic device 910 may supply power to the external electronic device 920 via a power terminal (e.g., V_BUS) of the USB interface. The external electronic device 920 may be driven using power supplied from the electronic device 910.

The status information may be a data type corresponding to a USB device class for communication with, for example, a keyboard, a mouse, a touch, a virtual reality (VR) sensor, an audio or video device, or the like. At this time, the status information may be produced as one of a key value, a mouse coordinate value, a touch coordinate value, a virtual reality sensor value, and an audio or video device control signal value. For example, in the case where the keyboard device class is used, when the connection of the power supply 930 is sensed, the electronic device 910 may generate a key value (e.g., 0x2fd or 0x2fe) corresponding to the set key as if a preset key were pressed and may transmit the generated key value to the external electronic device 920 via a data communication terminal.

The status information in the case where the power supply 930 is connected in the state in which the electronic device 910 and the external electronic device 920 are connected and the state information in the case where the external electronic device 920 is connected in the state in which the electronic device 910 and the power supply 930 are connected may have different values. For example, when the power supply 930 is connected in the state in which the electronic device 910 and the external electronic device 920 are connected, the status information may be Ox2fd. When the external electronic device 920 is connected in the state in which the electronic device 910 and the power supply 930 are connected, the status information may be Ox2fe.

The electronic device 910 and the external electronic device 920 can communicate information to each other and identify each other via the ID terminal of the connector. According to various embodiments, the status information may be, for example, a data type that may be transmitted through the ID terminal of the connector.

According to one embodiment, the connector may include an ID terminal that supports a "digital ID" scheme (e.g., the USB Type C connector is a CC terminal). In various embodiments, the status information may be a data type that can be transmitted and received via the digital ID terminal included in the connector.

According to another embodiment, the connector may include an ID terminal that supports a "resistance ID" scheme (e.g., the ID terminal of a micro USB connector). In various embodiments, the status information may be a data type that is transmitted in the manner of changing a resistance value through a "resistance ID" terminal included in the connector.

A part of the power supplied from the power supply 930 may be used to drive the electronic device 910 and another part of the power may be supplied to the external electronic device 920 via the power terminal described above. For example, the external electronic device 920 may drive the external electronic device 920 using the power of the power supply 930 that is supplied via the electronic device 910. Further, the external electronic device 920 can charge the battery 922 electrically connected thereto.

As such, the electronic device 910 according to an embodiment may transmit status information indicating that the power supply 930 is connected thereto to the external electronic device 920 via data communication (e.g., software information) without an additional component (e.g., a hardware device).

The electronic device 910, the external electronic device 920, and the power supply 930 may be connected via various communication interfaces. For example, the electronic device 910 may include a High Definition Multimedia Interface (HDMI), an optical interface, a D-SUB, or a lightning terminal, and may be connected to the external electronic device 920 or the power supply 930 on the basis of the HDMI, the optical interface, the D-SUB, or the lightning terminal.

The electronic device 910 may include a processor 915 (e.g., a Micro Controller Unit (MCU), a power management IC 914, an identification circuit 916 (e.g., a CCPD IC), a first connector 912, a second connector 911, a switching circuit 913, and/or a storage unit (not illustrated).

The processor 915 may control the operation of the electronic device 910 and/or a signal flow between blocks of the electronic device 910 and may perform a data processing function to process data. For example, processor 915 may be a Central Processing Unit (CPU), an Application Processor (AP), a Micro-Controller Unit (MCU), or a Micro-Processor Unit (MPU), and the like. The processor 915 may be formed as a single core processor or a multi-core processor.

The processor 915 may inform the external electronic device 920 of a change in the state of the electronic device 910 such as detachment of the power supply 930. For example, when the connection between the power supply 930 and the electronic device 910 is released, the processor 915 may recognize this via an interrupt signal line connected to the second connector 911. The processor 915 may communicate with the external electronic device 920 to inform the electronic device 910 of a state change. When the power supply 930 and the electronic device 910 are connected to each other, the processor 915 may recognize this via the interrupt signal line connected to the second connector 912. The processor 915 may communicate with the external electronic device 920 to inform the external electronic device 920 of the state change of the electronic device 910.

The power management circuit 914 may control the voltage of the power supplied to each component included in the electronic device 910. The power management circuit 914 may output a preset voltage (e.g., 3.0 V). For example, the power management circuit 914 may include a Low Drop-Out (LDO) voltage regulator.

The power management circuit 914 may receive the power of the external electronic device 920 or the power supply 930 and may output the preset voltage (e.g., 3.0 V). For example, when only the external electronic device 920 is connected without the connection of the power supply 930, the power management circuit 914 may receive the power supplied via the power terminal (V_BUS) 911a of the first connector 911 and may output the preset voltage. Alternatively, when the power supply 930 is connected to the electronic device 910, the power management circuit 914 may receive the power supplied from the power supply 930 via the second connector 912 and may output the preset voltage.

The identification circuit 916 may transmit data received via the data communication terminal 911b of the first connector 911 to the processor 915 and may transmit the message or information produced by the processor 915 to the external electronic device 920 via the data communication terminal 911b of the first connector 911. The identification circuitry 916 may include at least one of a Micro-USB Interface Controller (MUIC), a Cable and Connector Integrated Chip (CCIC), and a Power Delivery Integrated Chip (PDIC). According to various embodiments, the identification circuit 916 may determine whether the connection to the external electronic device 920 or the power supply 930 is made or released. For example, when the first connector 911 or the second connector 912 is a connector supporting the USB C type, the electronic device 910 may determine whether the external electronic device 920 is connected or released, or may determine whether the power supply 930 is connected or disconnected, via a CC line.

The switching circuit 913 may include at least one element according to various embodiments and may be configured as a circuit that changes a current transmission path according to a specific control signal or a specific condition or cuts off or connects the current transmission path. For example, the switching circuit 913 may include at least one (Metal-Oxide-Semiconductor Field-Effect Transistor (MOSFET).

In certain embodiments, the processor 915 can provide gating or biasing signals, causing the at least one MOSFET to form an open circuit or a short circuit.

A storage unit (not illustrated) may store applications necessary for an Operating System (OS) of the electronic device 910 and other options functions such as an audio reproduction function, an image or video reproduction function, and the like. The storage unit may correspond to the memory 130 of FIG. 1.

The storage unit may store various pieces of information and various programs necessary for controlling the power management method according to one embodiment. For example, the programs may include a routine for sensing the connection of the power supply 930, a routine for controlling on/off of the switching circuit 913 according to whether or not the power supply 930 is connected, a routine for producing status information for informing the connection of the power supply 930, or the like.

The first connector 911 may include a device for functionally connecting the external electronic device 920. The first connector 911 may include a power supply terminal 911a for power supply or reception, and a data communication terminal 911b and/or a ground terminal (not illustrated) for data communication with the external electronic device 920. The arrangement of the power supply terminal 911a, the data communication terminal 911b, and the like is not limited to that illustrated in FIG. 9, but may be modified according to the characteristics of the electronic device 910. The power supply terminal 911a may be referred to as a first pin, and the data communication terminal 911b may be referred to as a second pin. According to various embodiments, the first pin or the second pin may be configured with one pin or a plurality of pins.

According to various embodiments, the first connector may have a USB connector specification. In this case, the power supply terminal 911a may correspond to the VBUS terminal of the USB connector, and the data communication terminal 911b may correspond to D+ and D− terminals or Tx and Rx terminals.

The power supply terminal 911a may receive the power transmitted from the external electronic device 920 and may transmit the power transmitted from the power supply 930 to the external electronic device 920.

The data communication terminal 911b may include, for example, D+ and D− terminals, and/or Tx+/− and Rx+/− terminals. Various terminal names may be used depending on connectors. The electronic device 910 may transmit/receive information to/from the external electronic device 920 via the data communication terminal 911b.

The second connector 912 may include a device for electrically connecting the external electronic device 930. The second connector 912 may include a power supply terminal 912a for power supply or reception, and a data communication terminal 912b and/or a ground terminal (not illustrated) for data communication with the power supply 930. The arrangement of the power supply terminal 912a, the data communication terminal 912b, and the like is not limited to that illustrated in FIG. 9, but may be modified according to the characteristics of the electronic device 910. The second connector 912 may further include a device for identifying the type of the external electronic device 930. Like the first connector 911, the second connector 912 may include a USB interface specification. Thus, the second connector 912 may be similar to the first connector 911 described above in terms of configuration and operation. The power supply terminal 912a may be referred to as a third pin, and the data communication terminal 912b may be referred to as a fourth pin. According to various embodiments, the third pin or the fourth pin may be configured with one pin or a plurality of pins.

The connection sensing circuit (not illustrated) may check whether or not the external electronic device (e.g., the power supply 930) connected to the first pin is detached via the second connector 912. For example, the connection sensing circuit may check whether the power supply 930 is connected to or disconnected from the electronic device 910 via the second connector 912. The connection sensing circuit may also transmit information on the connection or disconnection of the power supply 930 to the processor 915.

Meanwhile, although not illustrated in FIG. 9, the electronic device 910 according to an embodiment may selectively further include components such as an input module such as a touch pad, a button key, a touch key, or the like, a digital sound source reproduction module, and/or various sensor modules such as an infrared sensor module, an illuminance module, or the like, a display module, and the like. In addition, the electronic device 910 according to an embodiment may further include components having the same level as the above-mentioned components.

The external electronic device 920 may include a processor 924 (e.g., a CPU or an AP), a power management circuit 923, a battery 922, a connector 921, an identification circuit 926, and/or a memory 925.

The connector 921 may include a device to be functionally connected to the electronic device 910. The connector 921 may include a power supply terminal 921a for power supply or reception, and a data communication terminal 921b and/or a ground terminal (not illustrated) for data communication with the electronic device 910. Herein, the power supply terminal 921a may be referred to as a fifth pin, and the data communication terminal 921b may be referred to as a sixth pin.

According to various embodiments, the connector may have a USB connector specification. In this case, the power supply terminal 921a may correspond to the VBUS terminal of the USB connector, and the data communication terminal 921b may correspond to D+ and D− terminals or Tx and Rx terminals.

The power supply terminal 921a may receive power transmitted from power supply 930 via the electronic device 910. The data communication terminal 921b may include, for example, D+ and D− terminals, and/or Tx+/− and Rx+/− terminals. Various terminal names may be used depending on connectors. The external electronic device 920 may transmit/receive information to/from the electronic device 910 via the data communication terminal 921b.

The battery 922 may supply power to each component included in the external electronic device 920. The battery 922 may be, for example, a rechargeable secondary battery. The battery 922 may be, for example, a battery that is electrically connected to the external electronic device 920, an embedded battery that is embedded in the external electronic device 920, or a detachable battery that is detachable by a user.

A memory 925 may store applications necessary for an OS of the external electronic device 920 and other options functions such as an audio reproduction function, an image or video reproduction function, and the like. The memory 925 may correspond to the memory 130 of FIG. 1.

The power management circuit 923 may adjust the power to be supplied to the external electronic device 920. The power management circuit 923 may include a Power Management Integrated Circuit (PMIC) (not illustrated), a voltage regulator (not illustrated), a power input/output unit, a charging IC (not illustrated), etc. In addition, a combination of various ICs, circuits, and software may have roles for power control and voltage regulation.

When the electronic device 910 and the power supply 930 are connected, the power management circuit 923 may receive power supplied from the power supply 930 via the power supply terminal 921a of the connector 921. In addition, when the connection between the electronic device 910 and the power supply 930 is released, the power management circuit 923 may supply power to the electronic device 910 via the power supply terminal 921a of the connector 921.

The power management circuit 923 may supply the power of the battery 922 to the electronic device 910 or may charge the battery 922 with the power supplied from the outside in response to the state of the external electronic device 920.

The processor 924 of the external electronic device 920 may perform functions of controlling the overall operations of the external electronic device 920 and a signal flow between the internal blocks of the external electronic device 920, and may perform a data processing function for processing data. For example, the processor 924 of the external electronic device 920 may be a CPU, an AP, or the like. The processor 924 of the external electronic device 920 may be formed as a single core processor or a multi-core processor. Alternatively, the processor 924 of the external electronic device 920 may be configured with multiple processors.

The processor 924 of the external electronic device 920 may receive from the electronic device 910 a notification as to whether the electronic device 910 and the power supply 930 are connected or disconnected. The processor 924 of the external electronic device 920 may control the operation of the above-described power management circuit 923 based on this notification.

The identification circuit 926 is connected to the ID terminal 921b of the connector 921. The identification circuit 926 may determine what the external device connected to the connector 921 is and may transmit identification information on the external electronic device (e.g., the electronic device 910) to the processor 924 of the external electronic device 920. As illustrated, the identification circuit 926 may be implemented in the form of a separate chip in the processor 924 of the external electronics 920. Alternatively, the identification circuit 926 may be implemented to be included in a part of the processor 924 of the external electronics 920.

For example, in the case of a USB Type C connector, the ID terminal 921b may correspond to a CC terminal, and the identification circuit 926 may correspond to a Configuration Channel Integrated Circuit (CCIC). The USB connector may have two CC terminals. For example, the CCIC (corresponding to the identification circuit 926 in the drawing) may determine the directionality of the cables connected to the connector 921. One of the CC terminals may be used for the purpose of transmitting power to the cables (or the external electronic device), and the remaining one of the CC terminals may be used for the purpose of determining what the device connected to the connector 921 is by communicating with a counterpart device connected via the cables and of managing the connection.

Various embodiments may be implemented in which the identification circuit 926 is omitted. For example, in various embodiments, the external electronic device 920 may be implemented without including the identification circuit 926. The external electronic device 920 may operate in a charging mode, an OTG (on the go) mode, or a power path mode, etc., under the control of the processor 924 of the external electronic device 920.

The charging mode is a mode for charging the battery 922 using power input from the outside. For example, the external electronic device 920 may charge the battery 922, via the power management circuit 923, with the power supplied from the power supply terminal 921a. According to one embodiment, when operating in the charging mode, the external electronic device 920 may supply a part of the power supplied from the outside to the battery 922 via the power management circuit 923 and may supply the remaining of the power to the components of another mobile terminal, for example, the processor 924, the identification circuit 926, etc., of the external electronic device 920.

The OTG mode is a mode in which the external electronic device 920 can supply power to various external devices, which are connected via a connectable interface, such as a mouse, a keyboard, and a USB memory. According to one embodiment, when the electronic device 910 is connected to the external electronic device 920, the external electronic device 920 operates in the OTG mode, and the power of the battery 922 can be supplied to the electronic device 910 via the power supply terminal 921a.

The power path mode is a mode in which the power, which is input from the outside to the external electronic device 920 via the power management circuit 923, is not supplied to the battery 922 and the power management circuit 923 does not supply the power to the components of another mobile terminal. For example, according to an embodiment, the external electronic device 920 may receive a part of the power from the power supply 930 electrically connected to the electronic device 910 and may provide the power to the power management circuit 923 without supplying the power to the battery 922.

The power supply 930 may include a control circuit 932, a connector 931, and a power connector 933.

The connector 931 may include a device to be functionally connected to the electronic device 910. The connector 931 may include a power supply terminal 931a for power supply or reception, and a data communication terminal 931b and/or a ground terminal (not illustrated) for data communication with the electronic device 910. Herein, the power supply terminal 931a may be referred to as a seventh pin, and the data communication terminal 931b may be referred to as an eighth pin.

According to various embodiments, the connector may have a USB connector specification. In this case, the power supply terminal 931a may correspond to the VBUS terminal of the USB connector, and the data communication terminal 931b may correspond to D+ and D− terminals or Tx and Rx terminals.

The power supply 930 may be supplied with commercial power through the power supply connector 933 and may supply the power to the electronic device 910 via the power supply terminal 931a. The data communication terminal 931b may include, for example, D+ and D− terminals, and/or Tx+/− and Rx+/− terminals. Various terminal names may be used depending on connectors. The power supply 930 may transmit/receive information to/from the electronic device 910 via the data communication terminal 931b.

Figure 10:
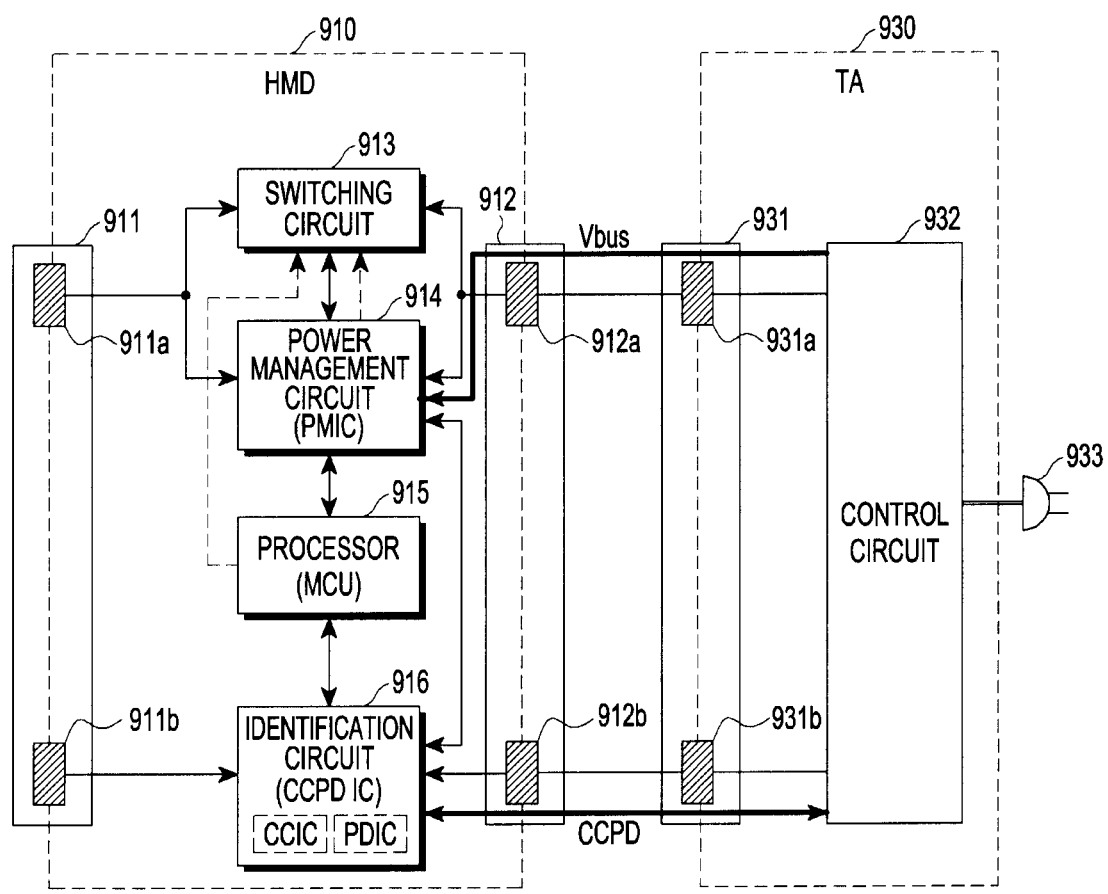
FIG. 10 is a diagram illustrating a detailed structure of the system according to various embodiments.

Hereinafter, various examples in which the electronic device 910 is connected to the external electronic device 920 and/or the power supply 930 so as to receive and transmit power in accordance with various embodiments will be described with reference to FIGS. 10 to 12. FIGS. 10 and 11 illustrate when one but not both of the external electronic device 920 or the power supply 930 are connected to the electronic device 910. The processor 924 causes the switching circuit 913 to form an open circuit, thereby causing either the first terminal 912a of the second connector 912 to provide power to the electronic device (FIG. 10) or the first terminal 911a of the first connector 911 (FIG. 11) to provide power to the electronic device. FIG. 12 illustrates when both the external electronic device 920 and the power supply 930 are connected to the electronic device 910. The processor 924 cause the switching circuit 913 to form a short circuit, thereby causing the first terminal 912a of the second connector 912 to provide power to the second terminal 911a of the first connector 911.

FIG. 10 is a diagram illustrating a detailed structure of the system according to various embodiments. Referring to FIG. 10, according to various embodiments, when the power supply 930 is connected to the electronic device 910, the electronic device 910 may be powered from the power supply 930. The processor 924 causes the switching circuit 913 to form an open circuit, thereby causing the first terminal 912a of the second connector 912 to provide power to the electronic device.

When the second connector 912 of the electronic device 910 is connected to the connector 931 of the power supply 930, the power supplied from the power supply 930 may be transmitted to the power supply terminal 912a of the second connector 912 via the power supply terminal 931a of the connector 931.

In the state in which the electronic device 910 is connected to the power supply 930 but is not connected to the external electronic device 920, the switching circuit 913 may be controlled to maintain the OFF state. For example, when the processor 915 of the electronic device 910 determines that the electronic device 910 is connected to the power supply 930 but is not connected to the external electronic device 920, the switching circuit 913 may be controlled to be in the OFF state. The on/OFF state control of the switching circuit 913 may be directly controlled by the processor 915, or may be controlled via the power management circuit 914. As used herein the "OFF state" of the switching circuit 913 shall be understood to refer to the open circuit or high impedance state. The "ON state" shall be understood to refer to the short circuit or low impedance state.

According to various embodiments, the power transmitted from the power supply 930 may be received via the power supply terminal 931a of the second connector 912, and the received power may be branched to the switching circuit 913 or the power management circuit 914 within the electronic device 910. According to various embodiments, since the switching circuit 913 is controlled to be in the OFF state, the received power can be provided to the power management circuit 914.

The power management circuit 914 can drive the electronic device 910 by supplying the received power to the processor 915 and/or the identification circuitry 916. For example, when the electronic device 910 is powered from the power supply 930 in the power-OFF state, the electronic device 910 may be switched to the power-ON state or a boot loader, which is responsible for booting the electronic device 910, may operate.

When the electronic device 910 is switched to the power-ON state by the power supply, the identification circuit 916 may operate, and the power-related communication, other various data communication, or the like may be performed between the electronic device 910 and the power supply 930 using the data communication terminals 912b and 931b via the identification circuit 916. For example, the power-related communication may be performed via a CCPD interface, and when the second connector 912 and the connector 931 are USB type C connectors, the power-related communication may be performed through a Vender Defined Message (VDM) using a PD communication protocol.

FIG. 11 is a diagram illustrating a detailed structure of the system according to various embodiments. Referring to FIG. 11, according to various embodiments, when the external electronic device 920 is connected to the electronic device 910, the electronic device 910 may be powered from the power supply 930. The processor 924 causes the switching circuit 913 to form an open circuit, thereby causing the first terminal 911a of the first connector 911 to provide power to the electronic device.

When the first connector 911 of the electronic device 910 is connected to the connector 921 of the external electronic device 920, the power supplied from the external electronic device 920 may be transmitted to the power supply terminal 911*a* of the first connector 911 via the power supply terminal 921*a* of the connector 921.

In the state in which the electronic device 910 is not connected to the power supply 930 but is connected to the external electronic device 920, the switching circuit 913 may be controlled to maintain the OFF state. For example, when the processor 915 of the electronic device 910 determines that the electronic device 910 is not connected to the power supply 930 but is connected to the external electronic device 920, the switching circuit 913 may be controlled to be in the OFF state. The on/OFF state control of the switching circuit 913 may be directly controlled by the processor 915, or may be controlled via the power management circuit 914.

According to various embodiments, the power transmitted from the external electronic device 920 may be received via the power supply terminal 911*a* of the first connector 911, and the received power may be branched to the switching circuit 913 or the power management circuit 914 within the electronic device 910. According to various embodiments, since the switching circuit 913 is controlled to be in the OFF state, the received power can be provided to the power management circuit 914.

The power management circuit 914 may drive the electronic device 910 by supplying the received power to the processor 915 and/or the identification circuitry 916. For example, when the electronic device 910 is powered from the power supply 930 in the power-OFF state, the electronic device 910 may be switched to the power-ON state or a boot loader, which is responsible for booting the electronic device 910, may operate.

When the electronic device 910 is switched to the power-ON state by the power supply, the identification circuit 916 may operate, and the power-related communication may be performed between the electronic device 910 and the external electronic device 920 using the data communication terminals 911*b* and 921*b* via the identification circuit 916. For example, the power-related communication may be performed via a CCPD interface, and when the first connector 911 and the connector 921 are USB type C connectors, the power-related communication may be performed through a Vender Defined Message (VDM) using a PD communication protocol.

FIG. 12 is a diagram illustrating a detailed structure of the system according to various embodiments. When both the external electronic device 920 and the power supply 930 are connected to the electronic device 910, the processor 924 causes the switching circuit 913 to form a short circuit, thereby causing the first terminal 912*a* of the second connector 912 to provide power to the second terminal 911*a* of the first connector 911.

Referring to FIG. 12, according to various embodiments, when the external electronic device 920 and the power supply 930 are connected to the electronic device 910, the electronic device 910 may supply the power received from the power supply 930 to the external electronic device 920. When the first connector 911 of the electronic device 910 is connected to the connector 921 of the external electronic device 920 and the second connector 921 is connected to the connector 931 of the power supply 930, the power supplied from the power supply 930 may be transmitted to the power supply terminal 912*a* of the second connector 912 via the terminal 931*a*.

In the state in which the electronic device 910 is simultaneously connected to the power supply 930 and the external electronic device 920, the switching circuit 913 may be controlled to maintain the ON state. For example, when the processor 915 of the electronic device 910 determines that the electronic device 910 is concurrently connected to the power supply 930 and the external electronic device 920, the switching circuit 913 may be controlled to be in the ON state. The on/OFF state control of the switching circuit 913 may be directly controlled by the processor 915, or may be controlled via the power management circuit 914.

According to various embodiments, the power transmitted from the power supply 930 may be received via the power supply terminal 931*a* of the second connector 912, and the received power may be branched to the switching circuit 913 or the power management circuit 914 within the electronic device 910. According to various embodiments, since the switching circuit 913 is controlled to be in the ON state, the received power may be transmitted to the external electronic device 920 via the switching circuit 913 and through the power supply terminal 911*a* of the first connector 911.

The external electronic device 920 may receive the power transmitted from the electronic device 910 via the power supply terminal 921*a* of the connector 921 and may provide the received power to the power management circuit 923.

When the external electronic device 920 is in the OFF state, the power management circuit 923 may drive the external electronic device 920 by supplying the received power to the processor 924 and/or the identification circuitry 926. For example, when the external electronic device 920 is powered from the power supply 930 via the electronic device 910 in the power-OFF state, the external electronic device 920 may be switched to the power-ON state or a boot loader, which is responsible for booting the external electronic device 920, may operate.

When the external electronic device 920 is switched to the power-ON state or the boot loader operates by the power supply, the identification circuit 926 may operate, and the power-related communication, other various data communication, or the like may be performed between the external electronic device 920 and the electronic device 910 using the data communication terminals 911*b* and 921*b* via the identification circuit 926. For example, the power-related communication may be performed via a CCPD interface, and when the first connector 911 and the connector 921 are USB type C connectors, the power-related communication may be performed through a Vender Defined Message (VDM) using a PD communication protocol.

An electronic device according to any one of various embodiments may include: a first connector including at least one first pin and at least one second pin configured to be connected to an external electronic device; a second connector including at least one third pin and at least one fourth pin configured to be connected to a power supply; a switching circuit; and a processor electrically connected to the first connector, the second connector, and the switching circuit. The processor is configured to check a connection with the external electronic device or a connection with the power supply and is connected to the external electronic device via the first connector, and The processor may be set to supply, when connected to the power supply via the second connector, power received from the power supply via the at least one third pin to the at least one first pin using the switching circuit.

According to various embodiments, the processor may be set to transmit, when it is determined that the power of the external electronic device is in an OFF state using the first connector, information related to control of power of the external electronic device via the at least one second pin of the first connector.

According to various embodiments, the second connector may support a Universal Serial Bus (USB) scheme.

According to various embodiments, the first connector may support a USB scheme, and the processor may be set to determine that the power of the external electronic device is in an OFF state when a designated signal is not received using the first connector.

According to various embodiments, the at least one second pin may include a Configuration Channel (CC) pin.

According to various embodiments, the information related to the control of the power may be included in a Vendor Defined Message (VDM) according to a Power Delivery (PD) communication standard.

According to various embodiments, the electronic device may include a Head-Mounted Display (HMD) device capable of being engaged with the external electronic device.

An electronic device according to any one of various embodiments may include: a first connector including at least one first pin and at least one second pin configured to be connected to an external electronic device; a second connector including at least one first pin and at least one second pin configured to be connected to a power supply; a switching circuit set to supply, when connected to the external electronic device via the first connector and connected to the power supply via the second connector, power received from the power supply via the at least one third pin to the at least one first pin; and a processor set to transmit, when it is confirmed that the power of the external electronic device is in an OFF state using the first connector, information related to control of power of the external electronic device via the at least one second pin of the first connector.

According to various embodiments, the second connector may support a USB scheme.

According to various embodiments, the first connector may support a USB scheme.

According to various embodiments, the at least one second pin may include a CC pin.

According to various embodiments, the information related to the control of the power may be included in a VDM according to a Power Delivery PD communication standard.

According to various embodiments, the electronic device may include a Head-Mounted Display (HMD) device capable of being engaged with the external electronic device.

Hereinafter, descriptions will be made of a power control procedure according to various embodiments with reference to FIGS. 13 to 15.

FIG. 13 is a flowchart illustrating a power control procedure between electronic devices according to various embodiments. Referring to FIG. 13, in operation 1301, when a power supply (e.g., the power supply 930 of FIGS. 9 to 12) is connected to a second connector of an electronic device (e.g., the electronic device 910 (e.g., an HMD) of FIGS. 9 to 12) (such as in FIG. 10), the power of the electronic device may be in an ON state by the supplied power in operation 1303.

When an external electronic device (e.g., the external electronic device 920 of FIGS. 9 to 12) is connected to a first connector 911 of the electronic device in operation 1305 (such as in FIG. 12), the electronic device may determine whether the power of the external electronic device is the ON state in operation 1307.

According to various embodiments, the method of determining by the electronic device 910 whether the power of the external electronic device 920 is in the ON state may be implemented in various ways. For example, the electronic device 910 may determine the power state of the external electronic device 920 by detecting signal, voltage, and resistance values input through at least one pin provided in the first connector 911 connected to the external electronic device 920. According to various embodiments, when the electronic device 910 fails to receive a designated signal through at least one pin provided in the first connector 911 connected to the external electronic device 920, it may be determined that the power of the power supply 920 is in the OFF state.

According to various embodiments, the identification circuit 910 of the electronic device 910 is configured to determine whether the power of the external electronic device 920 is in the ON state or in the OFF state from a signal received via the data communication terminal 911b (e.g., the second pin) of the first connector 911.

When it is determined that the power of the external electronic device is in the ON state, in operation 1309, the electronic device may receive various data from the external electronic device and may operate preset functions (e.g., functions that operate as the HMD device). According to various embodiments, in operation 1313, the electronic device may supply power to the external electronic device while operating the preset functions through communication with the external electronic device.

When it is determined that the power of the external electronic device is not in the ON state, the electronic device may control the switching circuit (e.g., the switching circuit 913 of FIGS. 10 to 12) provided in the electronic device to be in the ON state in operation 1311. Various embodiments may be implemented such that, when the power of the external electronic device is not in the ON state, it is possible for the user to select whether power is supplied to the external electronic device from the electronic device using various input interfaces (e.g., touch screen, physical key, etc.) provided in the electronic device.

In operation 1313, as the switching circuit is controlled to be in the ON state, the electronic device may supply power received from the power supply to the external electronic device.

When the electronic device determines that the power of the external electronic device is controlled (e.g., controlled to be turned ON from the OFF state) in operation 1315, the electronic device may transmit a power control message to the external electronic device in operation 1317. Various embodiments may be implemented such that the user may select whether to control the power of the external electronic device using various input interfaces (e.g., a touch a screen, a physical key, etc.) provided in the electronic device.

According to various embodiments, when the power of the external electronic device is in the ON state, a specific power control message (e.g., a message for controlling power to the OFF state from the ON state) may be transmitted to the external electronic device such that the external electronic device can receive power from the electronic device even in the OFF state.

FIG. 14 is a flowchart illustrating a power control procedure between electronic devices according to various embodiments. Referring to FIG. 14, in operation 1401, when an external electronic device (e.g., the external electronic device 920 of FIGS. 9 to 12) is connected to a first connector of an electronic device, such as in FIG. 11, (e.g., the electronic device 910 (e.g., an HMD) of FIGS. 9 to 12), the electronic device may determine whether the power of the external electronic device is in the ON state in operation 1403.

According to various embodiments, the method of determining by the electronic device 910 whether the power of the external electronic device 920 is in the ON state may be implemented in various ways. For example, the electronic device 910 may determine the power state of the external electronic device 920 by detecting signal, voltage, and resistance values input through at least one pin provided in the first connector 911 connected to the external electronic device 920. According to various embodiments, when the electronic device 910 fails to receive a designated signal through at least one pin provided in the first connector 911 connected to the external electronic device 920, it may be determined that the power of the power supply 920 is in the OFF state.

According to various embodiments, the identification circuit 910 of the electronic device 910 may determine whether the power of the external electronic device 920 is in the ON state or in the OFF state from a signal received via the data communication terminal 911b (e.g., the second pin) of the first connector 911. When it is determined in operation 1403 that the power of the external electronic device is in the ON state, in operation 1405, the electronic device may be switched to the ON state by the power supplied from the external electronic device. In operation 1407, the electronic device may receive various data from the external electronic device and may operate preset functions (e.g., functions that operate as the HMD device). According to various embodiments, in operation 1415, the electronic device may supply power to the external electronic device while operating the preset functions through communication with the external electronic device.

When it is determined in operation 1403 that the power of the external electronic device is not in the ON state, the electronic device may be connected to a power supply (e.g., the power supply 930 of FIGS. 9 to 12) via the second connector in operation 1409, thereby forming the configuration of FIG. 12.

When the power supply is connected to the second connector of the electronic device, the electronic device may be powered ON by the supplied power in operation 1411.

In operation 1413, the electronic device may control a switching circuit (e.g., the switching circuit 913 of FIGS. 10 to 12) provided in the electronic device to the ON state.

In operation 1415, as the switching circuit is controlled to be in the ON state, the electronic device may supply power received from the power supply to the external electronic device. Various embodiments may be implemented such that it is possible for the user to select whether power is supplied to the external electronic device from the electronic device using various input interfaces (e.g., touch screen, physical key, etc.) provided in the electronic device.

In operation 1407, when the electronic device determines that the power of the external electronic device is controlled (e.g., control to be turned ON from the OFF state), in operation 1419, the electronic device may transmit a power control message to the external electronic device. Various embodiments may be implemented such that the user may select whether to control the power of the external electronic device using various input interfaces (e.g., a touch a screen, a physical key, etc.) provided in the electronic device.

According to various embodiments, when the power of the external electronic device is in the ON state, a specific power control message (e.g., a message for controlling power to the OFF state from the ON state) may be transmitted to the external electronic device such that the external electronic device can receive power from the electronic device even in the OFF state.

FIG. 15 is a signal flowchart illustrating a power control procedure between electronic devices according to various embodiments. Referring to FIG. 15, in operation 1501, the external electronic device 820 (e.g., the external electronic device 920 of FIGS. 9 to 12) may be in the OFF state and in operation 1503, the electronic device 810 (e.g., the electronic device 910 (e.g., an HMD) of FIGS. 9 to 12) may be in the OFF state.

When the power supply (e.g., the power supply 930 of FIGS. 9 to 12) is connected to the second connector of the electronic device in operation 1505, thereby forming the configuration of FIG. 10, the electronic device may be supplied with power from the power supply by a switching circuit connection structure according to an embodiment in operation 1507, even if the electronic device is in the OFF state.

In operation 1509, the power of the electronic device may be turned ON by the supplied power.

When the external electronic device is connected to the first connector of the electronic device in operation 1511 (thereby forming the configuration of FIG. 12), the electronic device may determine whether the power of the external electronic device is in the ON state.

According to various embodiments, the method of determining by the electronic device 810 whether the power of the external electronic device 820 is in the ON state may be implemented in various ways. For example, the electronic device 810 may determine the power state of the external electronic device 820 by detecting signal, voltage, and resistance values input through at least one pin provided in the first connector 811 connected to the external electronic device 820. According to various embodiments, when the electronic device 810 fails to receive a designated signal through at least one pin provided in the first connector 811 connected to the external electronic device 820, it may be determined that the power of the power supply 820 is in the OFF state.

According to various embodiments, the identification circuit 810 of the electronic device 810 may determine whether the power of the external electronic device 820 is in the ON state or in the OFF state from a signal received via the data communication terminal of the first connector 911.

When it is determined that the power of the external electronic device is not in the ON state, the electronic device may control the switching circuit (e.g., the switching circuit 913 of FIGS. 10 to 12) to be in the ON state in operation 1513.

In operation 1515, as the switching circuit is controlled to be in the ON state, the electronic device may supply power received from the power supply to the external electronic device. In operation 1519, the external electronic device may operate the boot loader by the power provided via the electronic device.

When it is determined to control the power of the external electronic device (e.g., control the power from the OFF state to the ON state), the electronic device may produce a power control message in operation 1521 and may transmit the produced control message to the external electronic device in operation 1523.

The external electronic device may receive the power control message from the electronic device and may switch the power to the ON state according to the received power control message in operation 1525. In operation 1527, since the power is in the ON state, the external electronic device is able to transmit/receive data to/from the electronic device.

In a method for controlling power between electronic devices, a method of operating an electronic device according to any one of various embodiments may include: determining a connection with an external electronic device via at a first connector including at least one first pin and at least one second pin; determining a connection with a power supply via a second connector including at least one third pin and at least one fourth pin; receiving power from the power supply via the at least one third pin; and supplying the power, which is received from the power supply via the at least one third pin, to the at least one first pin when it is determined that an electronic device is connected to the external electronic device via the first connector and is connected to the power supply via the second connector.

According to various embodiments, the method may further include transmitting information related to control of power of the external electronic device via the at least one second pin of the first connector when it is determined that the power of the external electronic device is in an OFF state using the first connector.

According to various embodiments, the second connector may support a USB scheme.

According to various embodiments, the first connector may support a USB scheme, and the transmitting may include determining that the power of the external electronic device is in an OFF state when a designated signal is not received using the first connector.

According to various embodiments, the at least one second pin may include a CC pin.

According to various embodiments, the information related to the control of the power may be included in a VDM according to a Power Delivery PD communication standard.

According to various embodiments, the electronic device may include a Head-Mounted Display (HMD) device capable of being engaged with the external electronic device.

FIG. 16 is a perspective view illustrating a connector and an external connector of an electronic device according to various embodiments.

Referring to FIG. 16, a connector 1603 (e.g., the connector 201-9 of FIG. 2) according to one embodiment may be in the form of a socket, forming the outer face of the connector 1603, and may include a housing 1603-1 having an opening 1603-1a formed in at least a portion of the outer face thereof so as to be coupled with an external connector 1605 (e.g., the external face 20-9 of FIG. 2) in the form of a header. The connector 1603 according to one embodiment may include a substrate 1603-5 inside the opening 1603-1a, and the substrate 1603-5 may include a first face 1603-5a on which a plurality of first pins corresponding to the forward direction are disposed and a second face 1603-5b on which a plurality of second pins corresponding to the reverse direction are disposed.

According to various embodiments, the connector 1603 may further include first and second ratchet pins 1603a and 1603b that enable electrical or physical connection of the external connector 1605. According to various embodiments, at least a portion of the first and second ratchet pins 1603a and 1603b may include a fastening groove to which the external connector 1605 can be fastened. According to one embodiment, the first ratchet pin 1603a corresponds to the forward direction, the second ratchet pin 1603b corresponds to the reverse direction, and at least one of the first and second ratchet pins 1603a and 1603b may be selectively connected to wireless communication data.

FIGS. 17 and 18 are views for explaining the pins of the connector according to various embodiments.

Referring to FIG. 17, a connector 1700 (e.g., the connector 178 of FIG. 1 or the connector 201-9 of FIG. 2) according to various embodiments may be a USB type C connector. The connector 1700 may include a plurality of pins. According to various embodiments, the connector 1700 may include a plurality of first pins on a first face (e.g., face A) corresponding to the forward direction and a plurality of second pins on a second face (e.g., face B) corresponding to the reverse direction. For example, the plurality of first pins may include a GND pin 1711a, a TX1+ pin 1712a, a TX1− pin 1713a, a VBUS pin 1714a, a CC pin 1715a, a Dp1 pin 1716a, a Dn1 pin 1717a, an SBU1 pin 1718a, a VBUS pin 1719a, an RX2− pin 1720a, an RX2+ pin 1721a, and a GND pin 1722a. For example, the plurality of second pins may include a GND pin 1711b, a TX1+ pin 1712b, a TX1− pin 1713b, a VBUS pin 1714b, a VCONN pin 1715b, a Dp1 pin 1716b, a Dn1 pin 1717b, an SBU1 pin 1718b, a VBUS pin 1719b, an RX2− pin 1720b, an RX2+ pin 1721b, and a GND pin 1722b.

According to one embodiment, the plurality of first pins may include one or more first ground pins (e.g., GND pins 1711a and 522a) and one or more first signal pins (e.g., a TX1+ pin 1712a, a TX1− pin 1713a, a VBUS pin 1714a, a CC pin 1715a, a Dp1 pin 1716a, a Dn1 pin 1717a, an SBU1 pin 1718a, a VBUS pin 1719a, RX2− 1720a, and RX2+ 1721a), and the plurality of second pins may include one or more second ground pins (e.g., GND pins 1711b and 522b) and one or more second signal pins (e.g., a TX2+ pin 1712b, a TX2− pin 1713b, a VBUS pin 1714b, a VCONN pin 1715b, a Dp1 pin 1716b, a Dn1 pin 1717b, an SBU2 pin 1718b, a VBUS pin 1719b, an RX1− pin 1720b, and an RX1+ pin 1721b).

Referring to FIG. 18, the TX1+ and TX2+ pins 1712a and 512b and the TX1− and TX2− pins 1713a and 513b may be pins for super speed TX capable of fast transmission of data, the Vbus pins 1714a and 514b may be pins for USB cable charging power, and the CC pin 1715a may be a pin serving as an identification terminal. The VCONN pin 1715b may be a pin for supporting plug power, the Dp1 pins 1716a and 516b and the Dn1 pins 1717a and 517b may be pins for different bidirectional USB signals, the SBU1 and SBU2 pins 1718a and 518b may be pins that may be used for various signals (e.g., audio signals, display signals, etc.) as extra pins, and the RX2− and RX1− pins 1720a and 520b and the RX2+ and RX1+ pins 1721a and 521b may be pins for super speed RX capable of fast reception of data.

According to one embodiment, among one or more first signal pins (e.g., the TX1+ pin 1712a, the TX1− pin 1713a, the VBUS pin 1714a, the CC pin 1715a, the Dp1 pin 1716a, the Dn1 pin 1717a, the SBU1 pin 1718a, the VBUS pin 1719a, the RX2− pin 1720a, and RX2+ pin 1721a), at least one first signal pin may be selectively connected to a circuit (e.g., an audio module 460) associated with a signal of a designated function and a communication circuit (e.g., a broadcast module 470) capable of receiving broadcast data, and among one or more second signal pins (e.g., the TX2+ pin 1712b, the TX2− pin 1713b, the VBUS pin 1714b, the VCONN pin 1715b, the Dp1 pin 1716b, the Dn1 pin 1717b, the VBUS pin 1719b, the RX1− pin 1720b, and the RX1+ pin 1721b), at least one second signal pin may be selectively connected to a signal of a designated function (e.g., the audio module 460) and a wireless data communication signal (e.g., a broadcast data signal) (e.g., the communication module 470.

According to one embodiment, among the one or more first ground pins (e.g., the GND pins 1711a and 522a), at least one first ground pin may be selectively connected to the wireless communication data signal (e.g., the communication module 470), and among the one or more second ground pins (e.g., the GND pins 1711b and 522b), at least one second ground pin may be selectively connected to a wireless communication data signal (e.g., the communication module 470).

It has been described the first and second signal pins and the first and second ground pins are used as the pins that may be selectively connected to wireless communication data signals in the above embodiments as an example. However, according to one embodiment, at least a portion of a latch structure may be designated as a latch pin that may be selectively connected to a wireless communication data signal, and the latch pin may be selectively connected to the wireless communication data signal.

Figure 19:
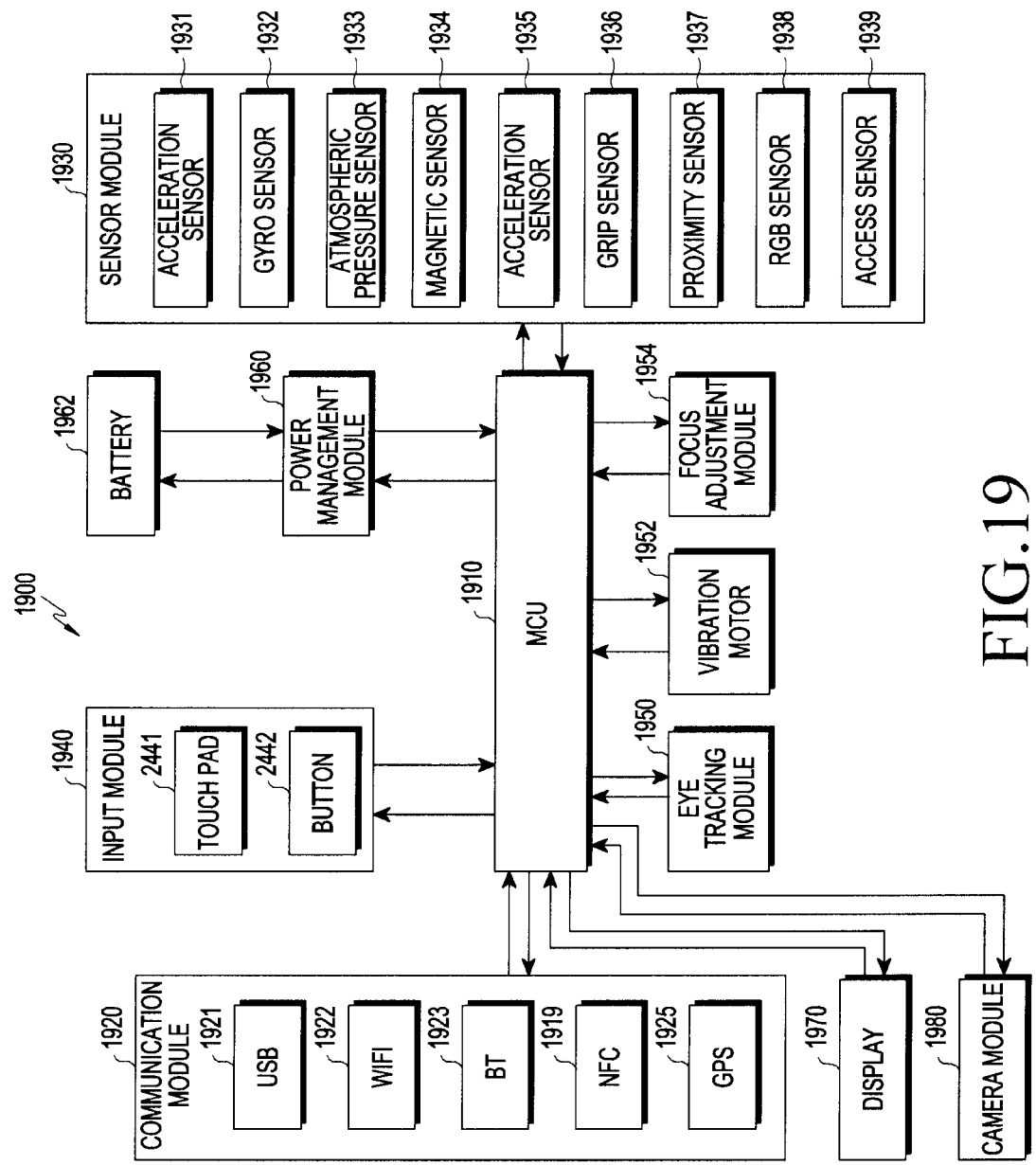
FIG. 19 is a block diagram illustrating an exemplary configuration of the HMD device according to various embodiments.

FIG. 19 is a block diagram illustrating another exemplary configuration of an exemplary HMD device 1900 according to various embodiments.

Referring to FIG. 19, the HMD device 1900 may provide a wearer with the same or similar operation as the electronic device described above, independently of the electronic device (e.g., a display device) mounted thereon. The HMD device 1900 may include an MCU 1910, a communication module 1920, a sensor module 1930, an input module 1940, an eye tracking module 1950, a vibrating motor 1952, a focus adjustment module 1954, a power management module 1960, a battery 1962, a display 1970, and a camera module 1980.

The communication module 1920 may include, for example, a USB module 1921, a Wi-Fi module 1922, a BT module 1923, an NFC module 1924, and a GPS module 1925. The sensor module 1930 may include, for example, an acceleration sensor 1931, a gyro sensor 1932, an atmospheric sensor 1933, a magnetic sensor 1934, an acceleration sensor 1935, a grip sensor 1936, a proximity sensor 1937, an RGB sensor 1938, and an access sensor 1939. The input module 1940 may include a touch pad 1941 and a button 1942.

The HMD device 1900 may include a display 1970 that may be fixedly mounted on the body instead of having a structure detachably mounted on an electronic device (e.g., a display device).

Figure 20:
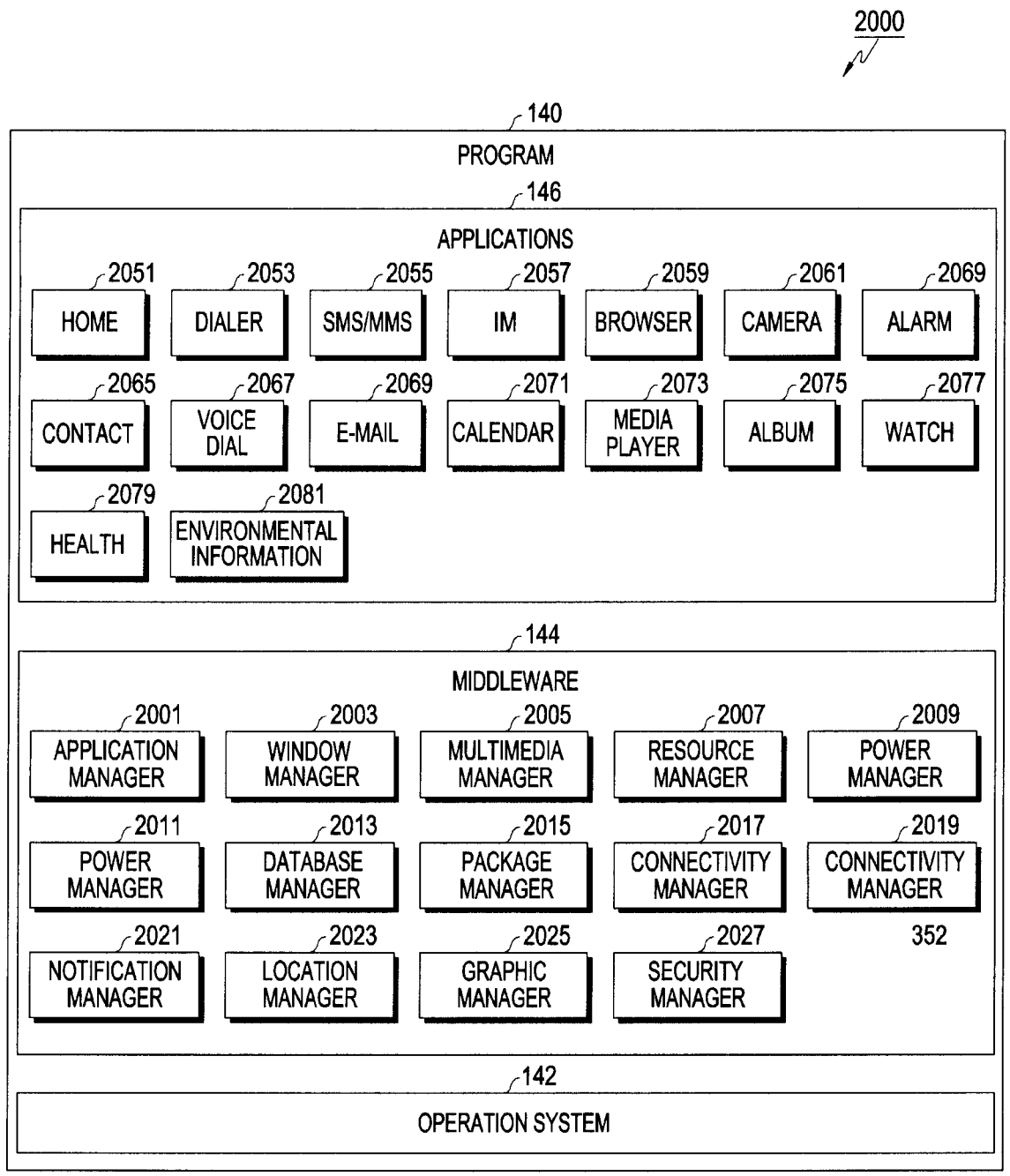
FIG. 20 is a block diagram illustrating a program module according to various embodiments.

FIG. 20 is a block diagram 2000 of a program 140 according to various embodiments. According to one embodiment, the program 140 may include an operating system 142 for controlling one or more resources of the electronic device 101, a middleware 144, or an application 146 executable on the operating system 142. The operating system 142 may include, for example, Android™, iOS™, Windows™, Symbian™, Tizen™, or Bada™. At least some of the programs 140 may be, for example, preloaded into the electronic device 101 at the time of manufacture, or downloaded or updated from an external electronic device (e.g., the electronic device 102 or 104 or the server 108) in the use environment of the user.

The operating system 142 may control (e.g., allocate or recover) system resources (e.g., a process, a memory, or a power source) of the electronic device 101. The operating system 142 may additionally or alternatively include other hardware devices of the electronic device 101 (e.g., an input device 150, a sound output device 155, a display device 160, an audio module 170, a sensor module 176, an interface 177, a haptic module 179, a camera module 180, a power management module 188, a battery 189, a communication module 190, a subscriber identification module 196, and one or more driver programs for driving an antenna module 197.

The middleware 144 may provide various functions to an application 146 so that the application 146 may use the functions or information provided by the one or more resources of the electronic device 101. The middleware 144 may include, for example, an application manager 2001, a window manager 2003, a multimedia manager 2005, a resource manager 2007, a power manager 2009, a database manager 2011, a package manager 2013, a connectivity manager 2015, a notification manager 2017, a location manger 2019, a graphic manager 2021, a security manager 2023, a telephony manager 2025, or a voice recognition manager 2027. The application manager 2001 may manage, for example, a life cycle of the applications 146. The window manager 2003 may manage, for example, a GUI resource that is used in a screen. The multimedia manager 2005 may determine, for example, a format required for reproducing various media files, and may perform encoding or decoding of the media files by using a codec that is suitable for the corresponding format. The resource manager 2007 may manage, for example, a source code of the applications 146 or a memory space. The power manager 2009 may manager, for example, a battery capacity, temperature, or power, and may determine or provide power information required for operating the electronic device 101 using the corresponding information. According to one embodiment, the power manager 2009 may be interlocked with a Basic Input/Output System (BIOS).

The database manager 2011 may generate, retrieve, or change, for example, a database to be used by the applications 146. The package manager 2013 may manage, for example, the installation or update of an application that is distributed in the form of a package file. The connectivity manager 2015 may manage, for example, a wireless connection or a wired connection between the electronic device 101 and the external electronic device. The notification manager 2017 may provide, for example, a function for notifying a user of a generated event (e.g., a call, a message, or an alarm). The location manager 2019 may manage, for example, position information of the electronic device 101. The graphic manager 2021 may manage a graphic effect to be provided to the user or a user interface associated therewith. The security manager 2023 may provide, for example, system security or user authentication. The telephony manager 2025 may manage, for example, a voice call or video call function of the electronic device 101. The voice recognition manager 2027 may transmit the voice data of the user to the server 108 and may receive a command corresponding to the function to be performed in the electronic device 101 or character data converted on the basis of the corresponding voice data. According to one embodiment, the middleware 2044 may dynamically delete some of the existing components or add new components. According to one embodiment, at least some of middlewares 144 may be included as part of the operating system 142, or may be implemented as software separate from the operating system 142.

The applications 146 may include, for example, a home application 2051, a dialer application 2053, an SMS/MMS application 2055, an Instant Message (IM) application 2057, a browser application 2059, a camera application 2061, an alarm application 2063, a contact application 2065, a voice recognition application 2067, an e-mail application 2069, a calendar application 2071, a media player application 2073, an album application 2075, a watch application 2077, a health application 2079 (e.g., an application for measuring a quantity of motion, or blood sugar), and an environmental information (e.g., atmospheric pressure, humidity, or temperature information) application 2081. According to one embodiment, the applications 146 may further include an information exchange application (not illustrated) that may support information exchange between the electronic device 101 and the external electronic device. The information exchange application may include, for example, a notification relay application configured to transmit designated information (e.g., a call, a message, or an alarm) to the external electronic devices, or a device management application configured to manage the external electronic devices. The notification relay application may transmit, for example, notification information corresponding to an event (e.g., mail reception) generated in another application (e.g., the email application 2069) of the electronic device 101 to an external electronic device, or may receive notification information from an external electronic device and provide the notification information to the user of the electronic device 101. The device management application may control, for example, the power (e.g., turn-on or turn-off) of an external electronic device that communicates with the electronic device 101 or some of its components (e.g., the display device 160 or the camera module 180) or a function (e.g., brightness, resolution, or focus of the display device 160 or the camera module 180). The device management application may additionally or alternatively support the installation, deletion, or update of an application executed in an external electronic device.

Figure 21:
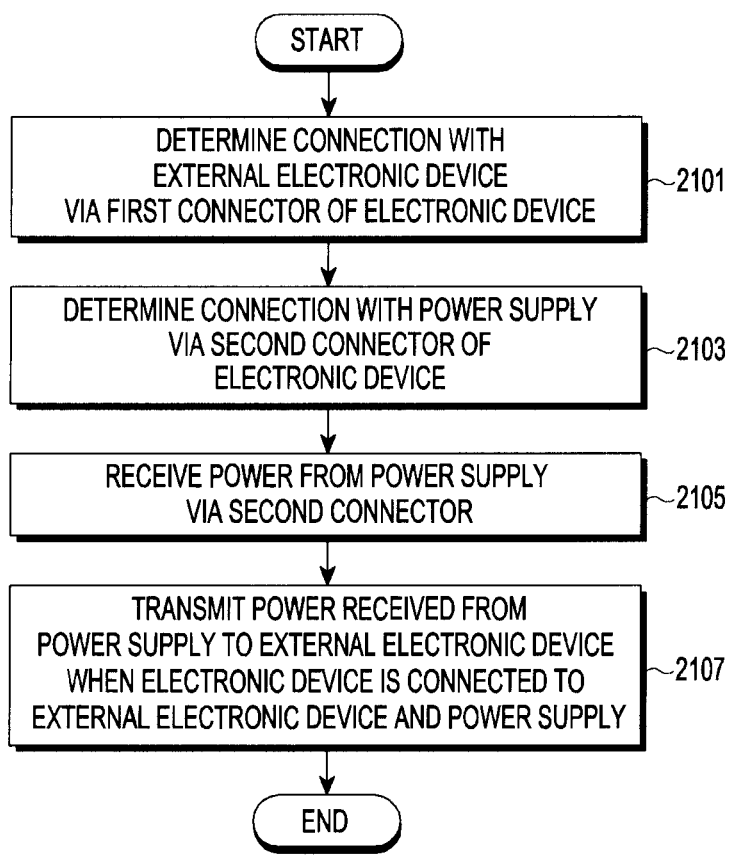
FIG. 21 is a flowchart illustrating a procedure of power of an external electronic device from an electronic device according to various embodiments.

FIG. 21 is a flowchart illustrating a procedure of power of an external electronic device from an electronic device according to various embodiments. Referring to FIG. 21, in operation 2101, the electronic device (the electronic device 910 of FIGS. 9 to 12 (e.g., an HMD) may determine whether it is connected to an external electronic device (e.g., the external electronic device 920 of FIGS. 9 to 12) via the first connector (e.g., the first connector 911 of FIG. 9). According to various embodiments, the first connector may include a power supply terminal (e.g., the power supply terminal 911a of FIG. 9) for power supply or reception, a data communication terminal (e.g., the data communication terminal 911b of FIG. 9) and/or a ground terminal (not illustrated) for data communication with an external electronic device. The power supply terminal 911a may be referred to as a first pin, and the data communication terminal 911b may be referred to as a second pin. According to various embodiments, the first pin or the second pin may be configured with one pin or a plurality of pins.

According to various embodiments, the first connector may have a USB connector specification. In this case, the power supply terminal may correspond to the VBUS terminal of the USB connector, and the data communication terminal may correspond to D+ and D– terminals or Tx and Rx terminals.

In operation 2103, the electronic device may determine whether it is connected to a power supply (e.g., the power supply 930 of FIG. 9) via a second connector (e.g., the second connector 912 of FIG. 9). According to various embodiments, the second connector may include a power supply terminal (e.g., the power supply terminal 912a of FIG. 9) for power supply or reception, a data communication terminal (e.g., the data communication terminal 912b of FIG. 9) for data communication with an external electronic device and/or a ground terminal (not illustrated). The power supply terminal may be referred to as a third pin, and the data communication terminal may be referred to as a fourth pin. According to various embodiments, the third pin or the fourth pin may be configured with one pin or a plurality of pins.

In operation 2105, the electronic device may receive power from the power supply via the second connector (e.g., the power supply terminal (third pin) of the second connector). When the electronic device is connected to the external electronic device and the power supply, in operation 2107, the electronic device may transmit the power received from the power supply to the external electronic device via the first connector (e.g., the power supply terminal (first pin) of the first connector).

The above described components of the electronic device according to various embodiments may be formed of one or more components, and a name of a corresponding component element may be changed based on the type of electronic device. The electronic device according to various embodiments may include at least one of the aforementioned elements. Some elements may be omitted or other additional elements may be further included in the electronic device. Also, some of the hardware components according to various embodiments may be combined into one entity, which may perform functions identical to those of the relevant components before the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may, for example, be the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation, and vice versa.

The programming module according to the present disclosure may include one or more of the aforementioned components or may further include other additional components, or some of the aforementioned components may be omitted. Operations executed by a module, a programming module, or other component elements according to various embodiments may be executed sequentially, in parallel, repeatedly, or in a heuristic manner. Furthermore, some operations may be executed in a different order or may be omitted, or other operations may be added.

According to various embodiments, in a storage medium storing commands, the commands are set to cause at least one processor to perform at least one operation when executed by the at least one processor. In a method for controlling power between electronic devices, the at least one operation may include: determining a connection with an external electronic device via at a first connector including at least one first pin and at least one second pin; determining a connection with a power supply via a second connector including at least one third pin and at least one fourth pin; receiving power from the power supply via the at least one third pin; and supplying the power, which is received from the power supply via the at least one third pin, to the at least one first pin when it is determined that an electronic device is connected to the external electronic device via the first connector and is connected to the power supply via the second connector.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

What is claimed is:

1. An electronic device comprising:
   a first connector including at least one first pin and at least one second pin configured to be connected to an external electronic device;
   a second connector comprising at least one third pin and at least one fourth pin configured to be connected to a power supply;
   a switching circuit; and
   a processor electrically connected to the first connector, the second connector, and the switching circuit,
   wherein the processor is configured to determine a connection with the external electronic device or a connection with the power supply,
   the processor is set to cause, when connected to the external electronic device via the first connector and connected to the power supply via the second connector, power received from the power supply via the at least one third pin to be supplied to the at least one first pin using the switching circuit, and
   the processor is set to determine that power of the external electronic device is in an OFF state when a designated signal is not received using the first connector, and transmit information related to control of the power of the external electronic device via the at least one second pin of the first connector.

2. The electronic device of claim 1, wherein the first connector supports a USB scheme.

3. The electronic device of claim 2, wherein the at least one second pin includes a configuration channel (CC) pin.

4. The electronic device of claim 1, wherein the information related to the control of the power is included in a vendor defined message (VDM) according to a power delivery (PD) communication standard.

5. The electronic device of claim 1, wherein the second connector supports a universal serial bus (USB) scheme.

6. The electronic device of claim 1, wherein the electronic device includes a head-mounted display (HMD) device capable of being engaged with the external electronic device.

7. An electronic device comprising:
   a first connector including at least one first pin and at least one second pin configured to be connected to an external electronic device;
   a second connector comprising at least one third pin and at least one fourth pin configured to be connected to a power supply;
   a switching circuit set to supply, when connected to the external electronic device via the first connector and connected to the power supply via the second connector, power received from the power supply via the at least one third pin to the at least one first pin; and
   a processor set to determine that power of the external electronic device is in an OFF state when a designated signal is not received using the first connector, and transmit information related to control of the power of the external electronic device via the at least one second pin of the first connector.

8. The electronic device of claim 7, wherein the second connector supports a universal serial bus (USB) scheme.

9. The electronic device of claim 7, wherein the first connector supports a USB scheme.

10. The electronic device of claim 9, wherein the at least one second pin includes a configuration channel (CC) pin.

11. The electronic device of claim 7, wherein the information related to the control of the power is included in a vendor defined message (VDM) according to a power delivery (PD) communication standard.

12. The electronic device of claim 7, wherein the electronic device includes a head-mounted display (HMD) device capable of being engaged with the external electronic device.

13. A method of controlling power between electronic devices, comprising:
   determining a connection with an external electronic device via a first connector comprising at least one first pin and at least one second pin;
   determining a connection with a power supply via a second connector comprising at least one third pin and at least one fourth pin;
   receiving power from the power supply via the at least one third pin;
   supplying the power, which is received from the power supply via the at least one third pin, to the at least one first pin using a switching circuit when it is determined that an electronic device is connected to the external electronic device via the first connector and is connected to the power supply via the second connector; and
   determining that power of the external electronic device is in an OFF state when a designated signal is not received using the first connector, and transmitting information related to control of the power of the external electronic device via the at least one second pin of the first connector.

14. The method of claim 13, wherein the first connector supports a USB scheme.

15. The method of claim 14, wherein the at least one second pin includes a configuration channel (CC) pin.

16. The method of claim 13, wherein the information related to the control of the power is included in a vendor defined message (VDM) according to a power delivery (PD) communication standard.

17. The method of claim 13, wherein the second connector supports a universal serial bus (USB) scheme.

18. The method of claim 13, wherein the electronic device includes a head-mounted display (HMD) device capable of being engaged with the external electronic device.

* * * * *